(12) United States Patent
Miyazaki

(10) Patent No.: US 9,690,475 B2
(45) Date of Patent: Jun. 27, 2017

(54) INFORMATION PROCESSING APPARATUS, INFORMATION PROCESSING METHOD, AND PROGRAM

(75) Inventor: Reiko Miyazaki, Tokyo (JP)

(73) Assignee: Sony Corporation, Tokyo (JP)

( * ) Notice: Subject to any disclaimer, the term of this patent is extended or adjusted under 35 U.S.C. 154(b) by 200 days.

(21) Appl. No.: 13/320,992

(22) PCT Filed: Mar. 30, 2010

(86) PCT No.: PCT/JP2010/055682
§ 371 (c)(1),
(2), (4) Date: Nov. 17, 2011

(87) PCT Pub. No.: WO2010/137400
PCT Pub. Date: Dec. 2, 2010

(65) Prior Publication Data
US 2012/0092283 A1    Apr. 19, 2012

(30) Foreign Application Priority Data

May 26, 2009    (JP) .................................. 2009-126949

(51) Int. Cl.
*G06F 3/044* (2006.01)
*G06F 3/0488* (2013.01)
(Continued)

(52) U.S. Cl.
CPC .......... *G06F 3/04883* (2013.01); *G06F 3/042* (2013.01); *G06F 3/04847* (2013.01);
(Continued)

(58) Field of Classification Search
CPC .. G06F 3/0488; G06F 3/04845; G06F 3/0346; G06F 3/04883; G06F 3/042;
(Continued)

(56) References Cited

U.S. PATENT DOCUMENTS

2005/0154798 A1 * 7/2005 Nurmi .................. G06F 1/1626
710/1
2006/0026521 A1    2/2006 Hotelling
(Continued)

FOREIGN PATENT DOCUMENTS

| EP | 1 892 611 | 2/2008 | |
| EP | 1892611 A1 * | 2/2008 | .............. H04M 1/02 |

(Continued)

OTHER PUBLICATIONS

International Search Report from Japanese Patent Office for PCT/JP2010/055682, Dated Jul. 13, 2010.
(Continued)

*Primary Examiner* — Ibrahim Khan
(74) *Attorney, Agent, or Firm* — Paratus Law Group, PLLC

(57) ABSTRACT

Provided is an information processing apparatus including a an operating tool detection unit that detects an indication direction of an operation tool in contact with a display panel and an operation identification unit that identifies a direction of an operation input by the operating tool, based on the detected indication direction of the operating tool. Thereby, the direction of the operation is detected based on the indication direction of the operating tool, so that an operation independent of an orientation of the display panel with respect to an operator becomes possible.

14 Claims, 25 Drawing Sheets

(51) Int. Cl.
 *G06F 3/042* (2006.01)
 *G06F 3/0484* (2013.01)
(52) U.S. Cl.
 CPC ............... *G06F 2200/1614* (2013.01); *G06F 2203/04108* (2013.01)
(58) Field of Classification Search
 CPC ......... G06F 3/04847; G06F 2200/1614; G06F 2203/04108; G06F 3/044
 USPC ............................... 345/173, 156, 174, 175; 178/18.06–18.093
 See application file for complete search history.

(56) References Cited

U.S. PATENT DOCUMENTS

| | | | | |
|---|---|---|---|---|
| 2006/0238517 A1* | 10/2006 | King | ................. | G06F 1/1626 345/173 |
| 2007/0297028 A1* | 12/2007 | Wulff | ................. | G06F 1/1632 358/520 |
| 2007/0300182 A1* | 12/2007 | Bilow | ................. | G06F 3/0488 715/799 |
| 2008/0006762 A1* | 1/2008 | Fadell | ................. | G01J 1/4204 250/201.1 |
| 2009/0167719 A1* | 7/2009 | Woolley | ................. | G06F 1/3203 345/174 |
| 2009/0224931 A1* | 9/2009 | Dietz | ................. | H04M 1/72577 340/670 |

FOREIGN PATENT DOCUMENTS

| | | | | |
|---|---|---|---|---|
| JP | 2006-72872 | 3/2006 | | |
| JP | 2008-3868 | 1/2008 | | |
| JP | EP 1892611 A1 * | 2/2008 | ............. | G06F 1/162 |

OTHER PUBLICATIONS

Nov. 23, 2012, EP Office Action for corresponding application No. EP 10 78 0357.

* cited by examiner

FIG.1
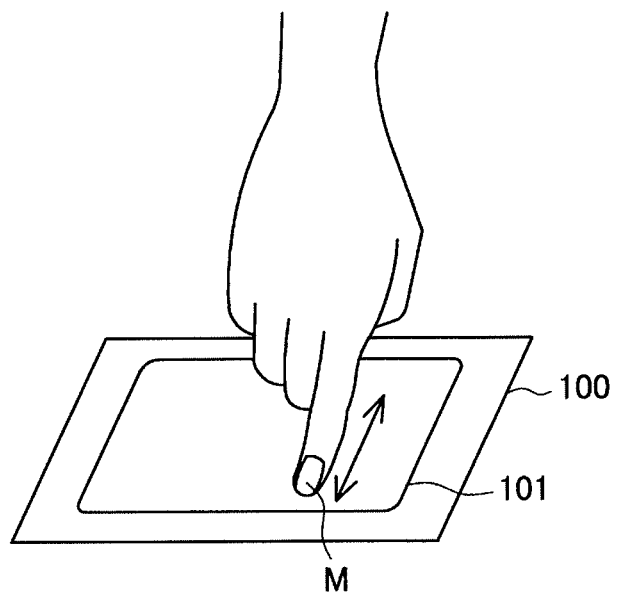
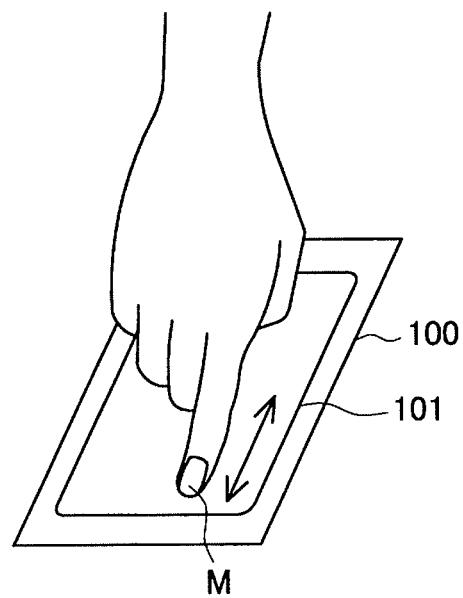

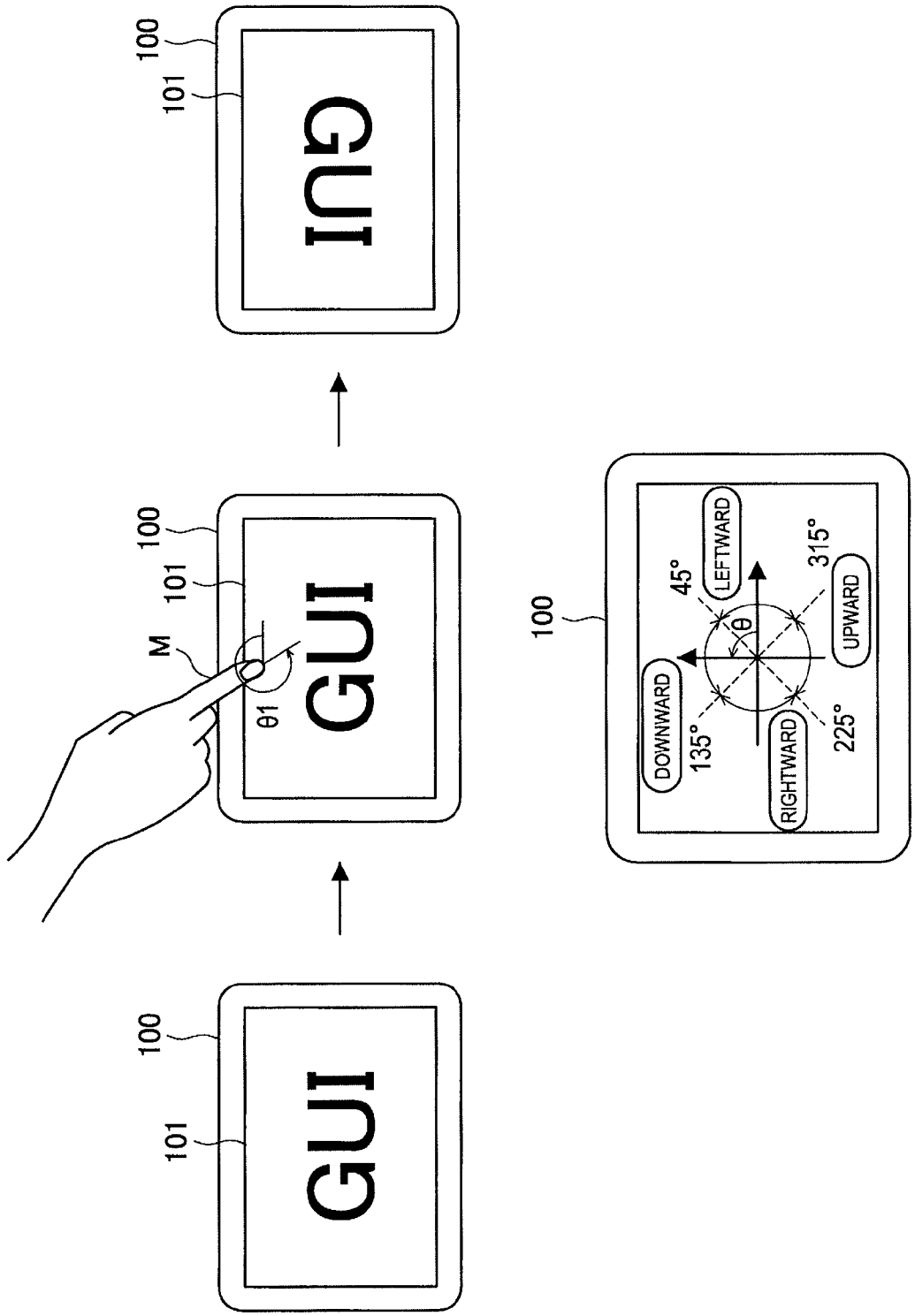

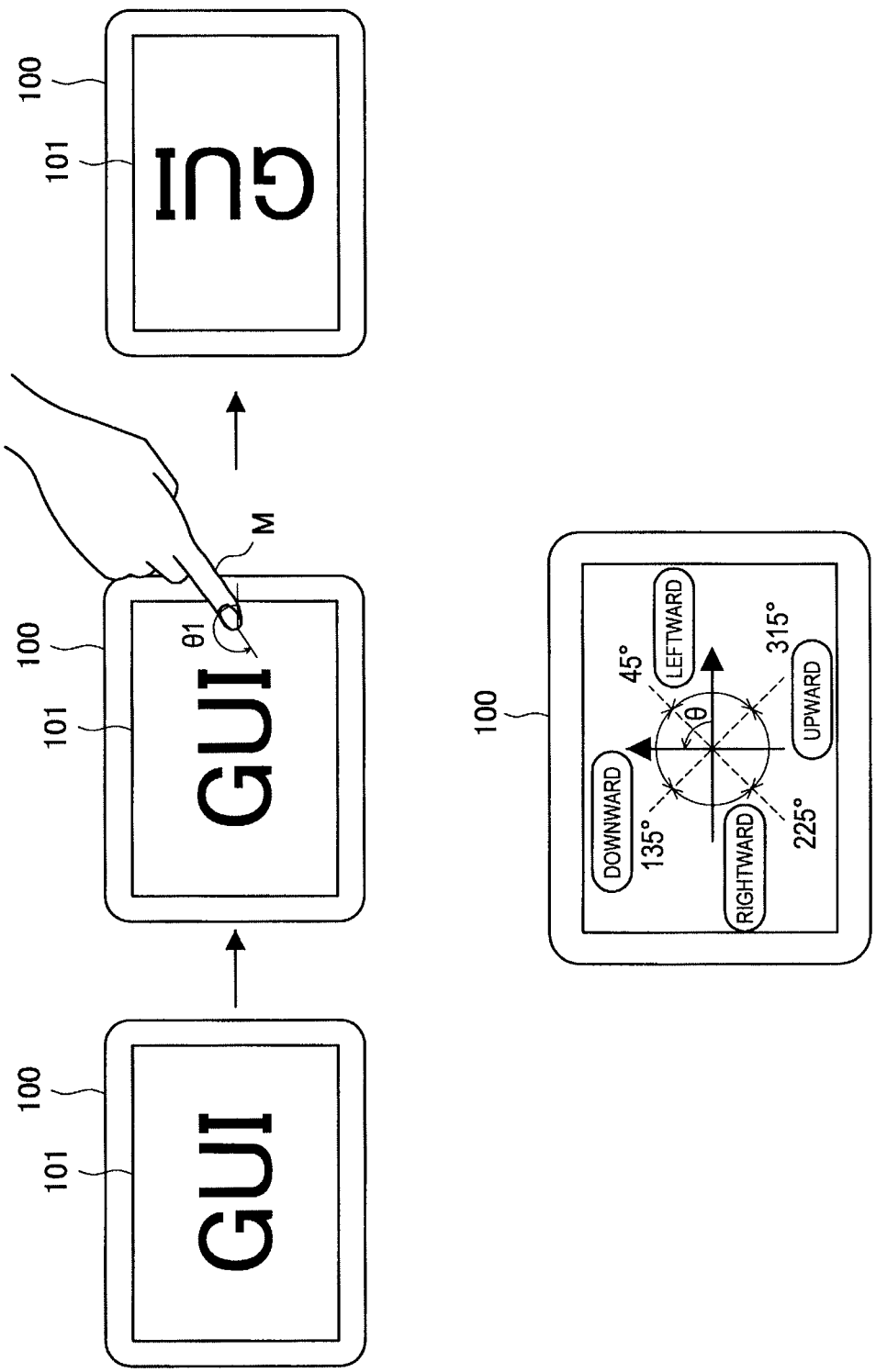

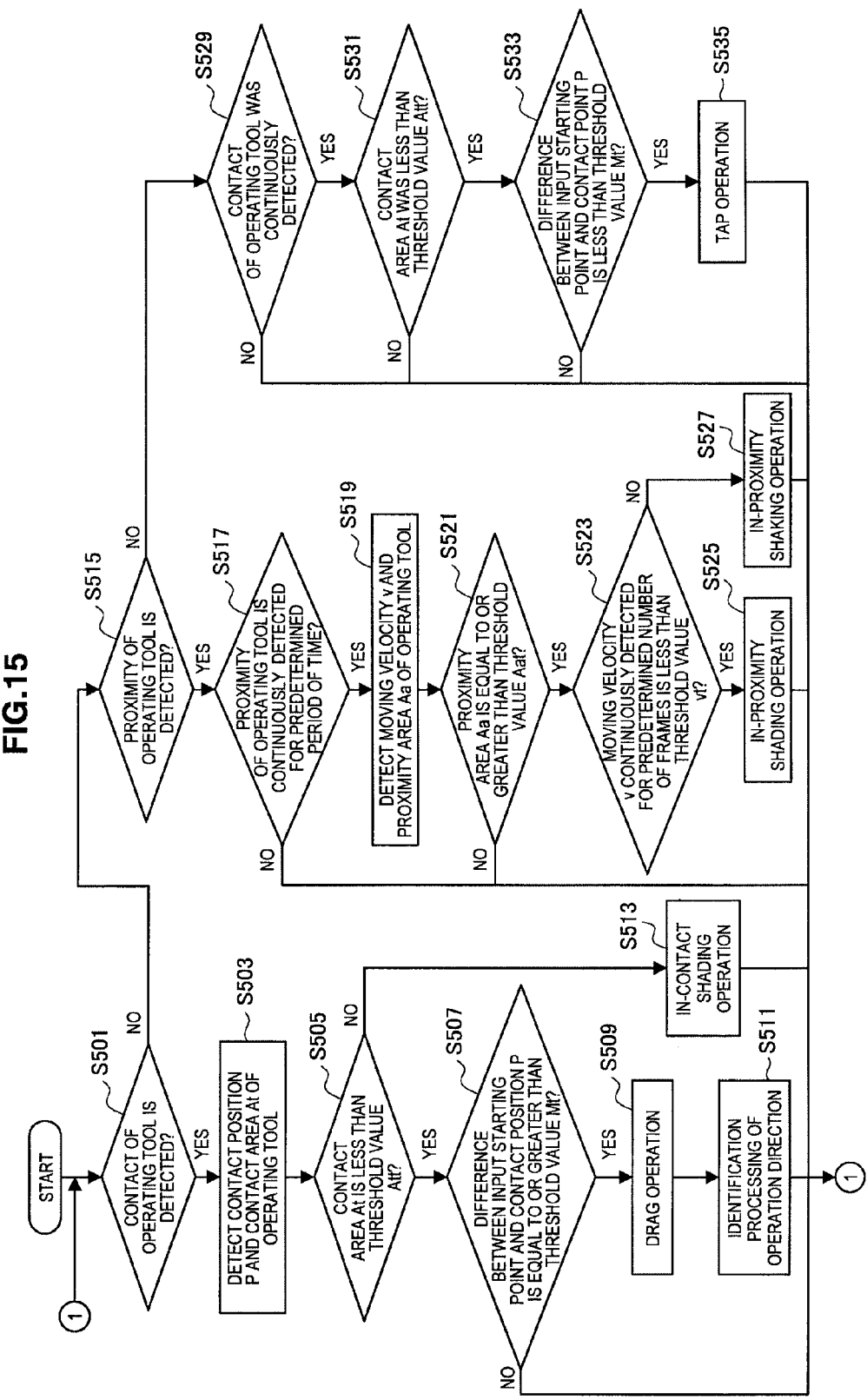

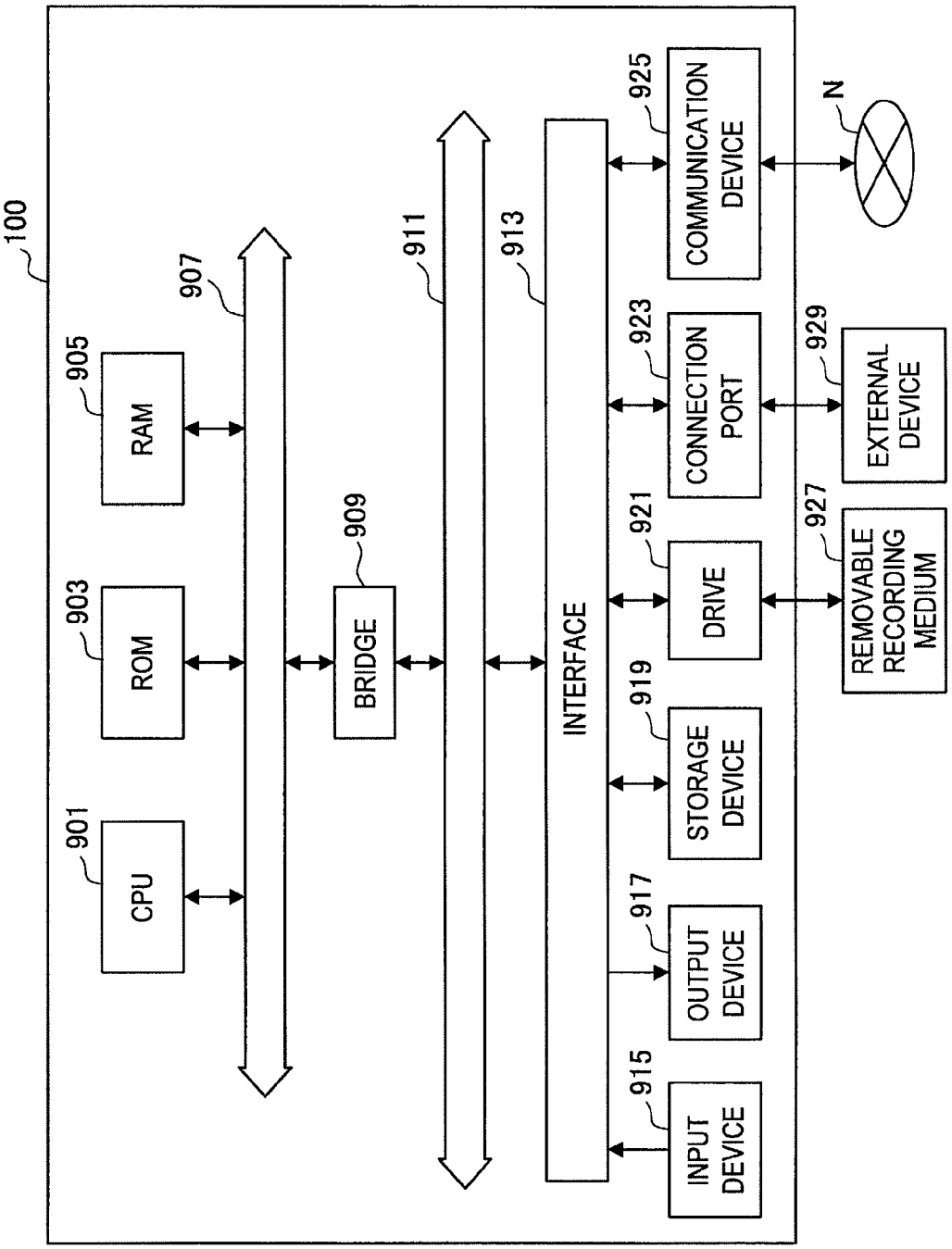

INFORMATION PROCESSING APPARATUS, INFORMATION PROCESSING METHOD, AND PROGRAM

TECHNICAL FIELD

The present invention relates to an information processing apparatus, an information processing method, and a program.

BACKGROUND ART

There has been known an information processing apparatus which detects by various kinds of sensors an action of an operating tool such as a finger, a hand and a stylus and which performs interaction with a user. The information processing apparatus detects a state of contact/proximity of the operating tool with a sensor, a remote movement of the operating tool captured by a sensor, or the like and identifies an operation input by a user, for example.

In particular, an information processing apparatus in which a touch panel interface is used identifies an operation input by a user, based on a state of contact of an operating tool with a display panel. Here, the user recognizes a display direction of a graphical user interface (GUI) on the display panel and performs an operation in accordance with the direction.

For example, when a slider object is displayed in a vertical direction of the GUI display, the user selects a slider tub and performs, upon recognizing an orientation of the GUI display, a drag operation in accordance with the vertical direction of the GUI display.

SUMMARY OF INVENTION

Technical Problem

Here, when the orientation of the display panel with respect to the user and the orientation of the GUI display do not match (when the display panel is arranged in such a manner that the top thereof is oriented on the left side with respect to a user, for example), the user sometimes cannot intuitively input an operation in accordance with the direction of the GUI display.

In this case, the user performs a drag operation on the display panel in a horizontal direction, in accordance with the vertical direction of the GUI display. Alternatively, the user performs, after changing the orientation of the display panel, a drag operation on the display panel in a vertical direction, in accordance with the vertical direction of the GUI display.

However, the user is forced to perform an operation dependent on the direction of the GUI display, namely the orientation of the display panel with respect to the user and therefore cannot always enjoy a good operation environment.

In recent years, in particular, instead of indirectly operating content via an object, the content itself is directly operated (operated without being located on the display panel). For this reason, if an operation independent of the orientation of the display panel with respect to the user is made possible, an intuitive operation becomes possible and the operation environment can be improved.

In light of the forgoing, the present invention aims to provide an information processing apparatus, an information processing method, and a program which make possible an operation independent of the orientation of the display panel with respect to the user.

Solution to Problem

According to the first aspect of the present invention, there is provided an information processing apparatus including an operating tool detection unit that detects an indication direction of an operation tool in contact with a display panel and an operation identification unit that identifies a direction of an operation input by the operating tool, based on the detected indication direction of the operating tool. Here, the operating tool detection unit may determine an indication direction of the operating tool based on an orientation of a tip portion of the operating tool. Thereby, the direction of the operation is identified based on the indication direction of the operating tool, so that an operation independent of an orientation of the display panel with respect to an operator becomes possible.

The operating tool detection unit may detect an indication direction and a moving direction of the operating tool moving while touching the display panel and the operation identification unit may identify a direction of an operation input by the operating tool, based on the detected identification direction and moving direction of the operating tool. Here, the operation identification unit may identify a direction of an operation input by the operating tool, based on an angle defined by the detected indication direction and moving direction of the operating tool. Thereby, based on the direction of the operation, which is identified from the indication direction and the moving direction of the operating tool, a drag operation independent of an orientation of the display panel with regard to an operator becomes possible.

The information processing apparatus further include a display control unit that controls display of the display panel, and the operation identification unit may identify a direction of an operation of rotating display of the display panel, based on the detected indication direction of the operating tool, and the display control unit may rotate the display of the display panel according to the identified direction of the operation. Thereby, based on the display of the display panel, which is rotated based on the direction of the operation identified from the indication direction of the operating tool, an operation independent of an orientation of the display panel with regard to an operator becomes possible.

The operating tool detection unit may continuously detect an indication direction of the operating tool and may determine, when the continuously detected indication direction of the operating tool is within a predetermined threshold value, an indication direction of the operating tool based on the continuously detected indication direction of the operating tool. Thereby, detection accuracy of the indication direction of the operating tool can be enhanced.

Further, according to the second aspect of the present invention, there is provided an information processing method including the steps of detecting an indication direction of an operation tool in contact with a display panel, and identifying a direction of an operation input by the operating tool, based on the detected indication direction of the operating tool.

Further, according to the third aspect of the present invention, there is provided a program for causing a computer to carry out the information processing method according to the second aspect.

Advantageous Effects of Invention

According to the present invention, it is possible to provide an information processing apparatus, an information processing method, and a program which make possible an operation independent of the orientation of the display panel with respect to the user.

BRIEF DESCRIPTION OF DRAWINGS

FIG. 1 is a diagram showing an outline of an information processing apparatus according to an embodiment of the present invention.

FIG. 10A is a schematic view showing the rotation processing of the display direction.

FIG. 10B is a schematic view showing the rotation processing of the display direction.

FIG. 15 is a flow diagram showing identification processing of an operation based on a contact/proximity state.

FIG. 24 is a block diagram showing an example of the hardware configuration of the information processing apparatus.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

[1. Outline of Information Processing Apparatus 100]

FIG. 1 is a diagram showing an outline of an information processing apparatus 100 according to an embodiment of the present invention. The information processing apparatus 100 according to the embodiment of the present invention at least detects a state of contact of an operating tool M, such as a finger, a hand and a stylus, with a display panel 101. In the following, a case where the information processing apparatus 100 has the display panel 101 built-in will be described, but the information processing apparatus 100 may be connected to the display panel 101 via communication means.

The information processing apparatus 100 detects an indication direction of the operating tool M in contact with the display panel 101 and identifies a direction of an operation input by the operating tool M, based on the detected indication direction of the operating tool M. Here, the information processing apparatus 100 detects the indication direction of the operating tool M based on an orientation of a tip portion of the operating tool M, such as a tip of a finger, for example. Thereby, the direction of the operation is identified based on the indication direction of the operating tool M, so that the operation independent of the orientation of the display panel 101 with respect to a user becomes possible.

In particular, the information processing apparatus 100 detects the indication direction and a moving direction of the operating tool M moving while touching the display panel 101 and identifies the direction of the operation input by the operating tool M, based on the detected indication direction and moving direction of the operating tool M. Thus, regardless whether the orientation of the display panel 101 is a horizontal orientation or a vertical orientation, a drag operation independent of the orientation of the display panel 101 with respect to a user becomes possible based on the direction of the operation identified from the indication direction and the moving direction of the operating tool M.

[2. Functional Configuration of Information Processing Apparatus 100]

Figure 2:
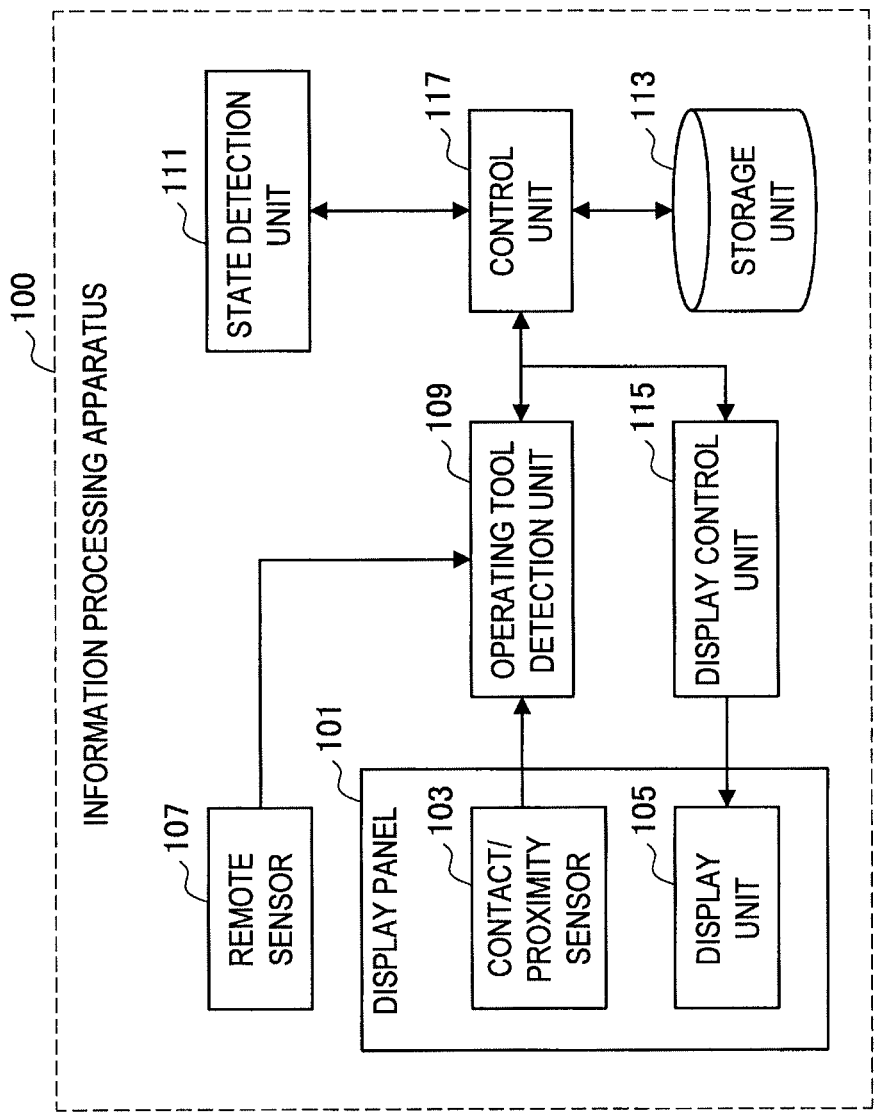
FIG. 2 is a block diagram showing an example of the functional configuration of the information processing apparatus according to the embodiment of the present invention.

FIG. 2 is a block diagram showing an example of the functional configuration of the information processing apparatus 100 according to an embodiment of the present invention. The information processing apparatus 100 is configured to include the display panel 101, a remote sensor 107, an operating tool detection unit 109, a state detection unit 111, a storage unit 113, a display control unit 115, and a control unit 117.

The display panel 101 functions as a contact/proximity sensor 103 and a display unit 105. The contact/proximity sensor 103 captures a contact/proximity state of the operating tool M. The contact/proximity sensor 103 is, for example, an optical or capacitive sensor, but in the following will be assumed a case of capturing a contact/proximity state of the operation state M based on a light receiving state of the display panel 101. The display unit 105 displays an object, content, a processing result of an application, or the like under the control of the display control unit 115. In addition, the object is an arbitrary object composing a GUI, such as an icon, a button and a thumbnail.

The remote sensor 107 consists of a stereo camera or the like, which images and captures a remote movement of the operating tool M such as a predetermined gesture.

The operating tool detection unit 109 detects a state of the operating tool M by using the contact/proximity sensor 103 and the remote sensor 107. The operating tool detection unit 109 detects a contact/proximity/movement state and a remote movement of the operating tool M. The operating tool detection unit 109 particularly detects an indication direction, a predetermined gesture, or the like of the operating tool M. The operating tool detection unit 109 detects the indication direction of the operating tool M with respect to the display panel 101 and particularly detects the indication direction and a moving direction of the operating tool M moving while touching the display panel 101. In addition, the indication direction of the operating tool M also in proximity as well as in contact with the display panel 101 may be detected.

Based on the light receiving state, the operating tool detection unit 109 detects the presence or absence of contact/proximity of the operating tool M, the contact/proximity area of the operating tool M, the indication direction and a contact/proximity gesture of the operating tool M with respect to the display panel 101. In addition, a detection method of the operating tool M by the contact/proximity sensor 103 will be described in detail below. The operating tool detection unit 109 detects a remote gesture based on an imaging result of the remote sensor 107. The operating tool detection unit 109 detects the predetermined gesture by comparing the contact/proximity/remote movement of the operating tool M with preliminarily registered gesture information.

The state detection unit 111 includes an acceleration sensor, a gyroscope and the like and detects the static state and the orientation of the own apparatus. The display control unit 115 controls the display of the object, the content, the processing result of the application or the like by the display unit 105.

The storage unit 113 stores therein an information processing program, an application program, object data, gesture information, and the like. The control unit 117 controls each unit by the execution of the information processing program and controls the overall operation of the information processing apparatus 100.

The control unit 117 functions as an operation identification unit that identifies the operation direction input by the operating tool M, based on the indication direction of the operating tool M. Here, the control unit 117 particularly identifies the direction of an operation input by the operating tool M, based on the detected indication direction and moving direction of the operating tool M.

Moreover, the control unit 117 functions as a mode control unit that controls, according to the static state or the orientation of the own apparatus, a mode in which an operation of the operating tool M on the own apparatus is detected.

[3. Detection Method of Operating Tool M]

On the display panel 101, RGB pixels and light receiving sensors are arranged in matrix. The light receiving sensor functions as the contact/proximity sensor 103 by receiving light emitted from the display panel 101 and reflected by the operating tool M and capturing the contact/proximity state of the operation tool M based on a light receiving state. Then, the operating tool detection unit 109 creates a sensor image S by digitally processing the output result of the contact/proximity sensor 103.

The operating tool detection unit 109 calculates a luminance value indicating a right receiving state corresponding to each of the pixels based on the sensor image S and performs a ternary process to the luminance value by using two predetermined threshold values of Th1 and Th2. In the ternary process, the luminance value of the each pixel is classified into a first, a second, and a third categories, and the area of the sensor image S is divided into a first, a second and a third areas A1, A2 and A3 corresponding to each of the categories. The first, the second, the third areas A1, A2, and A3 correspond to areas of high luminance, medium luminance and low luminance and are specified as a contact area, a proximity area, and non-contact/non-proximity area of the operating tool M, respectively.

The operating tool detection unit 109 detects the contact of the operating tool M with the display panel 101 based on the presence of the first area A1 and detects the proximity of the operating tool M to the display panel 101 based on the presence of the second area A2. Moreover, the operating tool detection unit 109 detects each of the contact area and the proximity area of the operating tool M by calculating the areas of the first and the second areas A1 and A2.

In particular, the operating tool detection unit 109 calculates positions of the center of gravity G1 and G2 of the first and the second areas A1 and A2, calculates a direction of a straight line (the line of the center of gravity) connecting the calculated positions of the center of gravity G1 and G2 and detects the indication direction of the operating tool M based on the position of the center of gravity G1 of the first area A1 and the line of the center of gravity. The indication direction of the operating tool M is defined as the direction indicating the center of gravity G1 of the first area A1 along the line of the center of gravity.

Figure 3A:
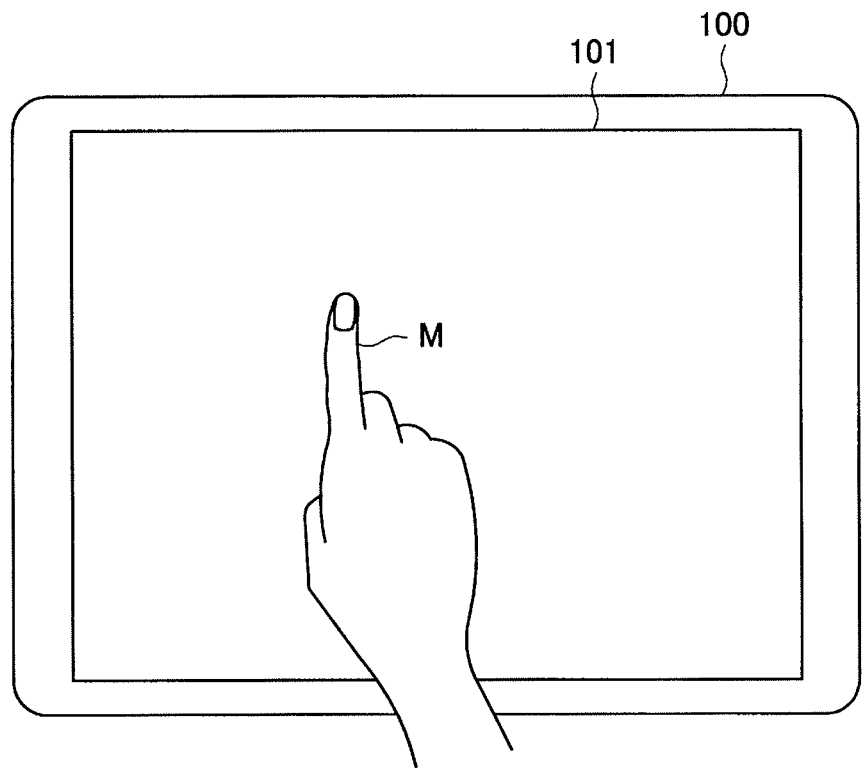
FIG. 3A is a diagram showing a state of an operating tool on a display panel.
Figure 3B:
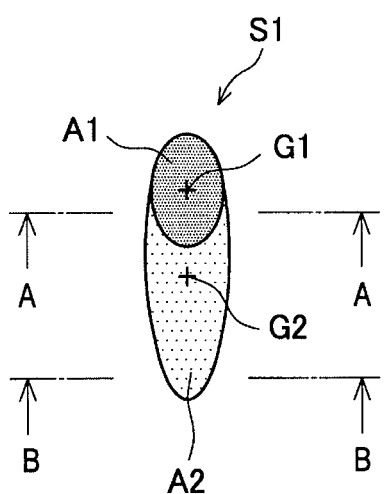
FIG. 3B is a diagram showing areas specified on a sensor image in the state shown in FIG. 3A.
Figure 4A:
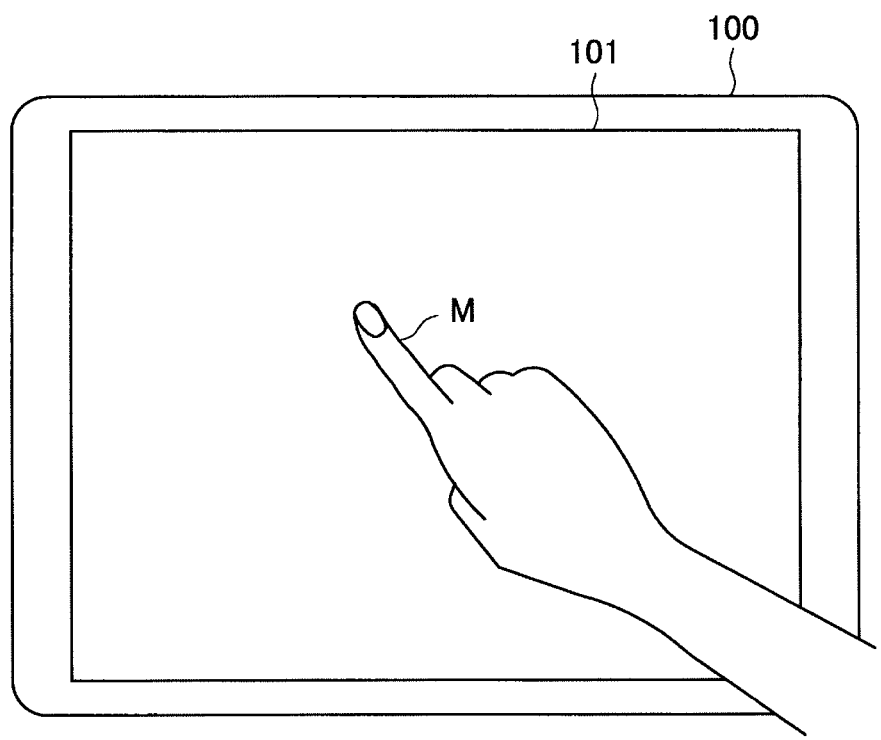
FIG. 4A is a diagram showing a state of the operating tool on the display panel.
Figure 4B:
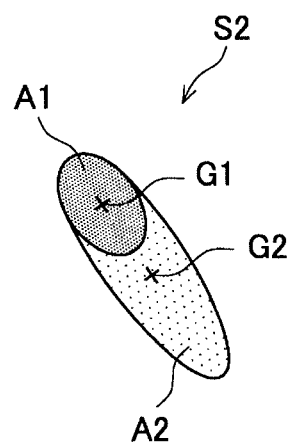
FIG. 4B is a diagram showing areas specified on a sensor image in the state shown in FIG. 4A.
Figure 5A:
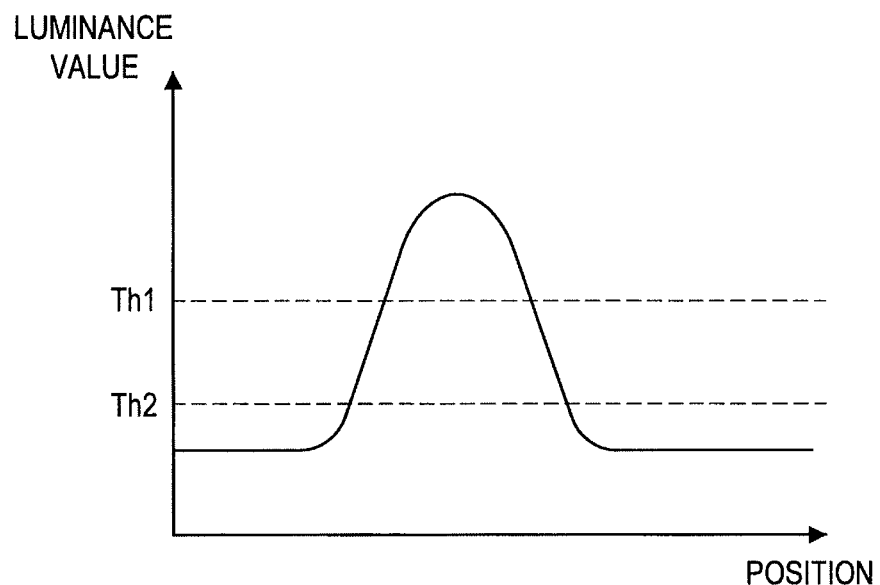
FIG. 5A is a graph showing a distribution of luminance values on the line A-A in FIG. 3A.
Figure 5B:
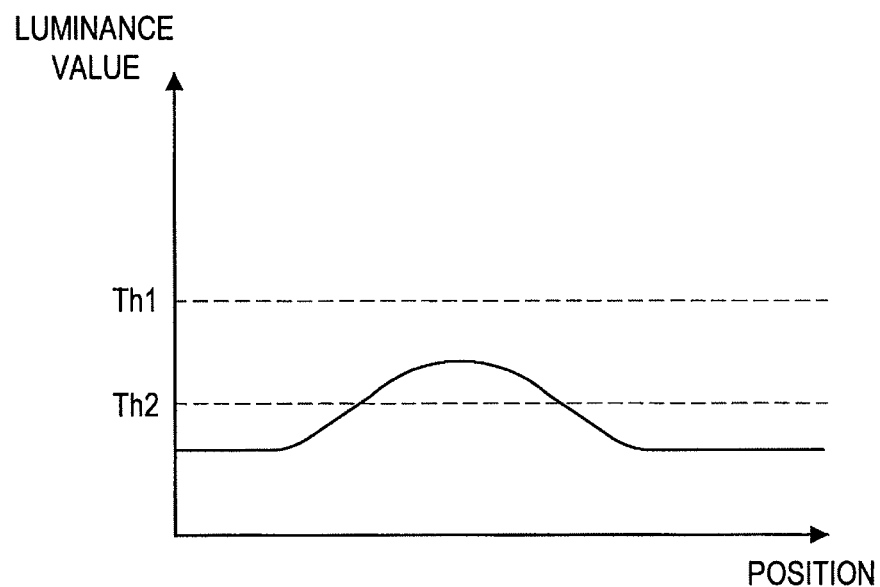
FIG. 5B is a graph showing a distribution of luminance values on the line B-B in FIG. 3A.
Figure 6:
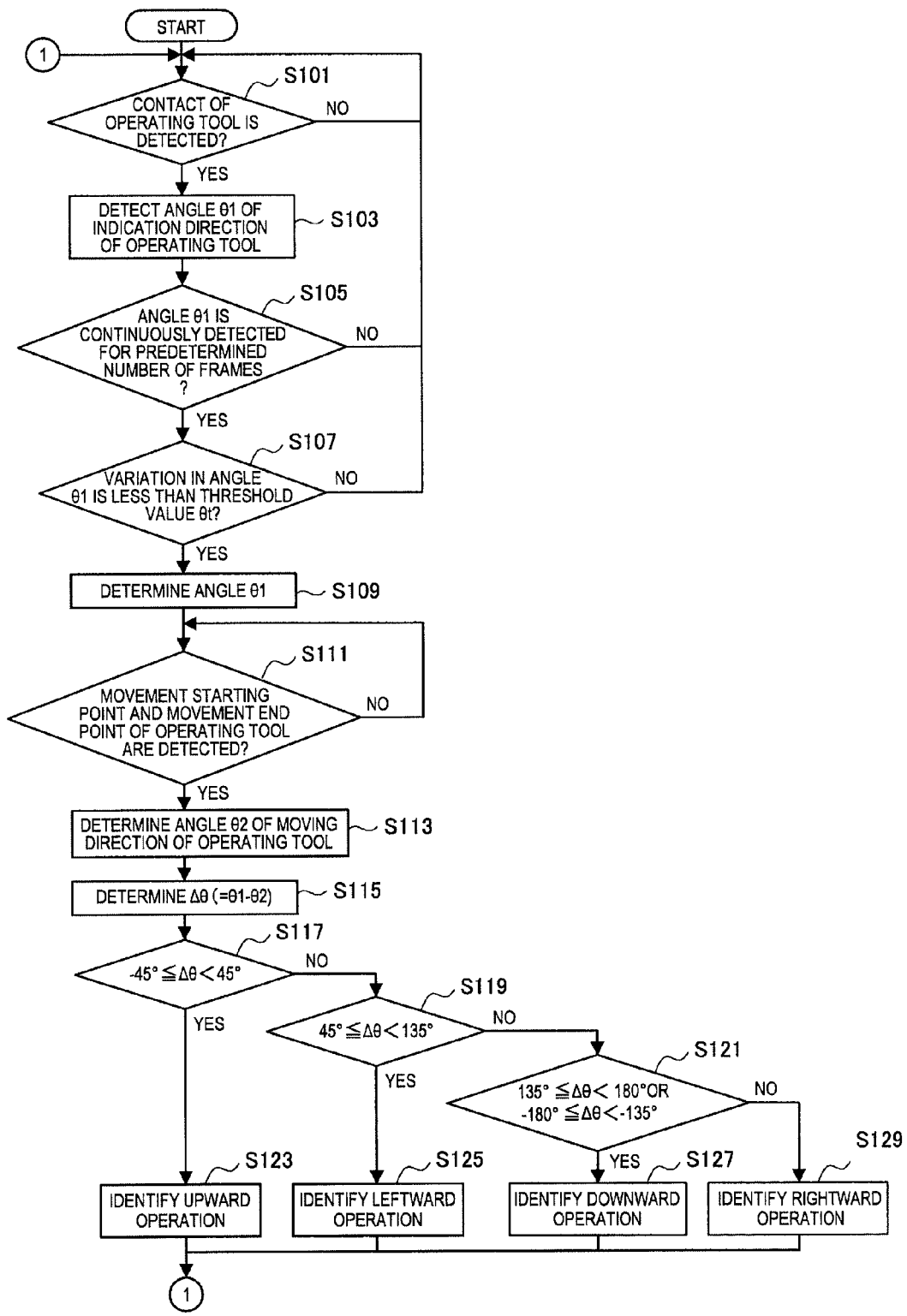
FIG. 6 is a flow diagram showing identification processing of an operation direction.

In the following, a detection method of the indication direction of the operating tool M will be described with reference to FIG. 3 to FIG. 5. FIG. 3 and FIG. 4 are diagrams showing states of the operating tool M on the display panel 101 (FIG. 3A and FIG. 4A) and the first and the second areas specified on the sensor images S1 and S2 (FIG. 3B and FIG. 4B). FIG. 5 are graphs showing distributions of luminance values on the sensor image S1 in FIG. 3B, and FIG. 5A and FIG. 5B show the distributions of luminance values on the A-A line and B-B line, respectively.

FIG. 3 and FIG. 4 show a case of changing the indication direction of the operating tool M on the display panel 101. In this case, a tip portion of the operating tool M (a fingertip) touches the display panel 101 and a part other than the tip portion of the operating tool M (the ball of the finger) comes into proximity with the display panel 101.

In the state shown in FIG. 3, the operating tool M indicates the upward direction of GUI display (see FIG. 3A). In this case, the operating tool detection unit 109 detects the indication direction of the operating tool M as the upward direction of the GUI display based on the distribution of the luminance values on the sensor image S1 (see FIG. 3B). For example, in the example shown in FIG. 5, contact and proximity of the operating tool M are detected from the first and the second areas A1 and A2 detected on the A-A line (see FIG. 5A), and proximity of the operating tool M is detected from the second area A2 detected on the B-B line (see FIG. 5B).

In the state shown in FIG. 4, the operating tool M indicates the upper left direction of the GUI display (see FIG. 4A). In this case, the operating tool detection unit 109 detects the indication direction of the operating tool M as the upper left direction of the GUI display based on the distribution of the luminance values on the sensor image S2 (see FIG. 4B).

[4-1. Identification Processing of Operation Direction]

In the following, there will be given a description of a processing of identifying the direction of an operation input by the operating tool M based on the indication direction and the moving direction of the operating tool M moving while touching the display panel 101.

FIG. 8 is a flow diagram showing the identification processing of the operation direction and FIG. 7 and FIG. 8 are schematic views showing the identification processing of the operation direction.

When the operating tool detection unit 109 detects contact of the operating tool M (step S101), the operating tool detection unit 109 detects the indication direction of the operating tool M based on the detection method of the operating tool M described above (S103). Here, the indication direction of the operating tool M may be detected in either the state in which the operating tool M is moving or the state in which the operating tool is not moving.

Figure 7A:
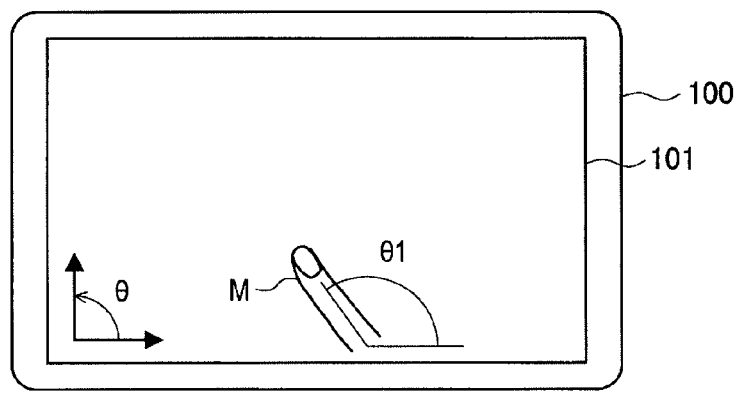
FIG. 7A is a schematic view showing the identification processing of the operation direction.

The indication direction of the operating tool M is defined as an angle $\theta1$ based on a coordinate system virtually set on the display panel 101 as shown in FIG. 7A, for example. The coordinate system can be set independently of the orientation of the display panel 101, but in the following will be assumed a case where a usual rectangular coordinate system is set in accordance with the vertical direction and the horizontal direction of the display panel 101. In this case, the angle $\theta1$ is defined counterclockwise from the first quadrant to the fourth quadrant of the rectangular coordinate system.

The operating tool detection unit 109 determines whether the angle $\theta1$ is continuously detected for the predetermined number of frames (S105). Each of detected values is stored in a buffer, which is not shown in figures, or the like, for example. Then, if variation in the detection results is less than a predetermined threshold value $\theta t$ (S107), the operating tool detection unit 109 determines the angle $\theta1$ as an intermediate value of the detection results, or the like (S109).

Figure 7B:
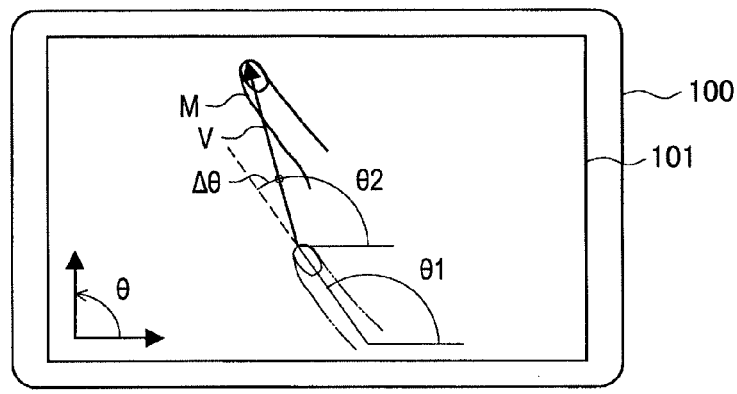
FIG. 7B is a schematic view showing the identification processing of the operation direction.

After determining the angle $\theta1$, the operating tool detection unit 109 detects a movement starting point and a movement end point of the operating tool M (S111) and determines the moving direction of the operating tool M. (S113). The moving direction of the operating tool M is defined as an angle $\theta2$ based on the same coordinate system as the angle $\theta1$ based on a movement vector V that connects the movement starting point and the movement end point of the operating tool M, as shown in FIG. 7B.

In the following, a case where the operating tool M moves in a straight line will be assumed for convenience of description. In this case, the movement starting point is defined as a point where the contact of the operating tool M is first detected in the state of not having detected the contact of the operating tool M. In the same manner, the movement end point is defined as a point where the non-contact of the operating tool M is first detected in the state of having detected the movement of the operating tool M in contact. In addition, in the case where the operating tool M moves in curving, there can be defined the movement starting point and the movement end point for each curve movement based on a changing point of the moving direction.

Figure 7C:
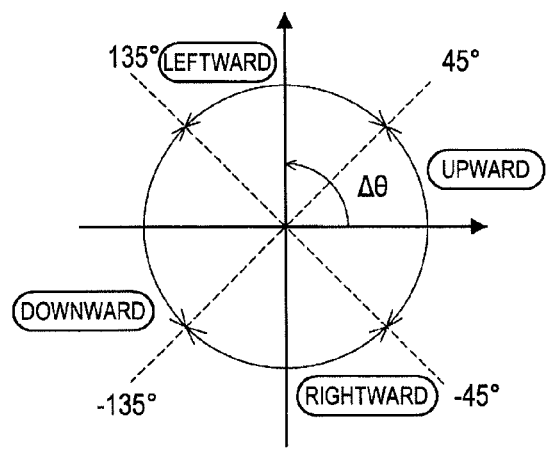
FIG. 7C is a schematic view showing the identification processing of the operation direction.

The control unit 117 determines a difference $\Delta\theta(=\theta1-\theta2)$ between the angles $\theta1$ and $\theta2$ that indicate the indication direction and the moving direction of the operating tool M (S115). The control unit 117 identifies the direction of the operation input by the operating tool M, based on the difference $\Delta\theta$ (S117, S119, and S121). The operation direction is identified based on the difference $\Delta\theta$ between the angles $\theta1$ and $\theta2$ as shown in FIG. 7C.

The operation direction is, for example, identified as upward in the case of $-45°\leq\Delta\theta<45°$ (S123) and is identified as leftward in the case of $45°\leq\Delta\theta<135°$ (S125). In the same manner, the operation direction is identified as downward in the case of $135°\leq\Delta\theta<180°$ or $-180°\leq\Delta\theta<-135°$ (S127) and is identified as rightward in the case of $-135°\leq\Delta\theta<-45°$ (S129).

In addition, in order to enhance identification accuracy of the operation direction, the operation direction may be identified as upward in the angular range $-30°\leq\Delta\theta<30°$. Moreover, the angular range may be adjusted according to the dominant hand of the user.

In FIG. 8, there is shown, as an example of the identification processing of the operation direction, a case of selecting a tab T of a slider bar O vertically displayed on the GUI display and operating the tab upward.

Figure 8A:
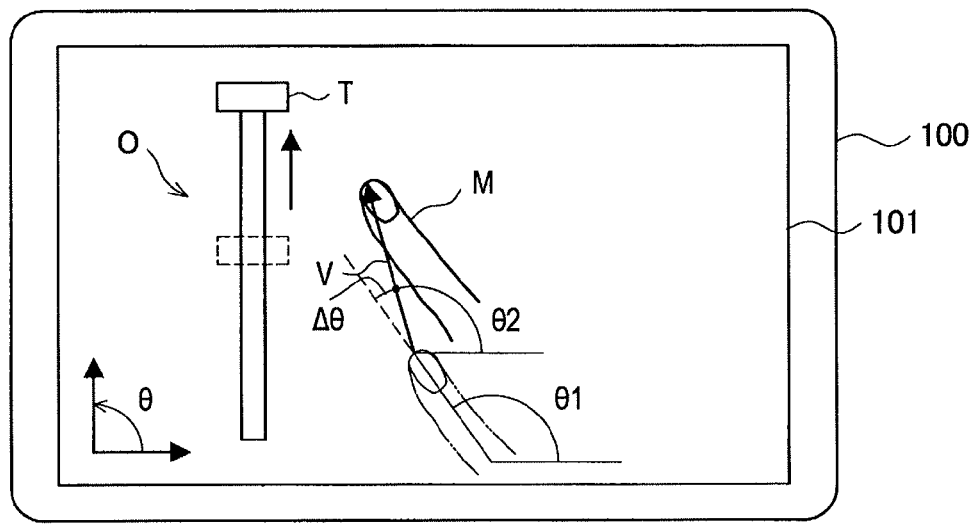
FIG. 8A is a schematic view showing the identification processing of the operation direction.

As shown in FIG. 8A, in the case where the orientation of the display panel 101 with respect to the user and the orientation of the GUI display match, (i.e., a case where the display panel 101 is arranged in such a manner that the top thereof is oriented upward with respect to the user), the user drags the tab T upward with respect to the display panel 101 in accordance with the upward direction of the GUI display. Here, the drag operation may be performed on the tab T as the object, or may be performed in the state in which the tab T is selected, for example, in an area where no object is displayed.

For example, when the indication direction and the moving direction of the operating tool M are detected as the angle θ1=135° and the angle θ2=120°, the difference is Δθ=15°, so that as shown in FIG. 7C, an upward operation is identified. This enables the user to operate a slider O upward.

Figure 8B:
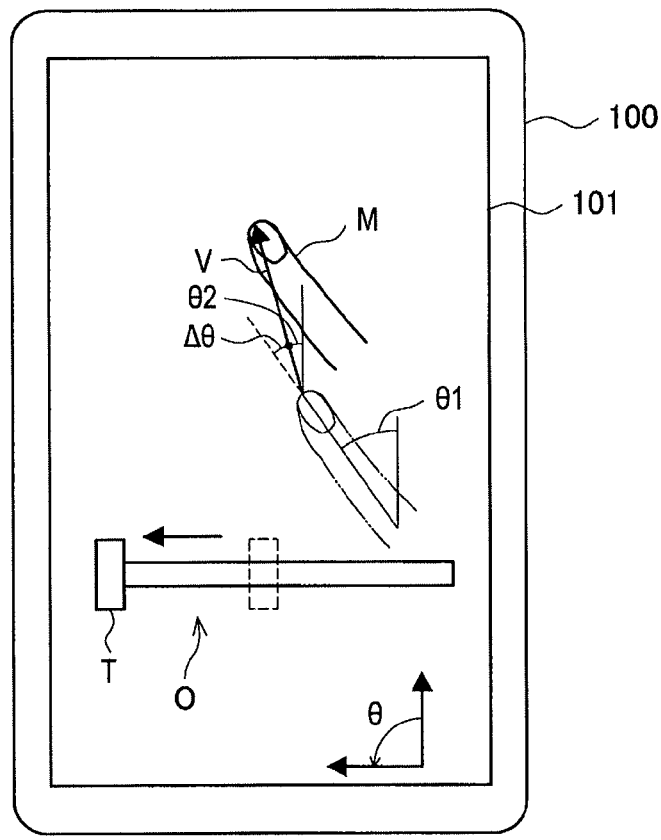
FIG. 8B is a schematic view showing the identification processing of the operation direction.

On the other hand, as shown in FIG. 8B, the orientation of the display panel 101 with respect to the user and the orientation of the GUI display do not match (e.g., the case where the display panel 101 is arranged in such a manner that the top thereof is oriented on the left side with respect to the user), the user drags the tab T upward with respect to the display panel 101 in accordance with the right direction of the GUI display.

For example, when the indication direction and the moving direction of the operating tool M are detected as the angle θ1=45° and the angle θ2=20°, the difference is Δθ=25°, so that as shown in FIG. 7C, an upward operation is identified. This enables the user to operate the slider O upward by performing a drag operation upward with respect to the display panel 101 in the same manner as the case where the both orientations match (FIG. 8A) even in the case where the orientation of the display panel 101 with respect to the user and the orientation of the GUI display do not match (FIG. 8B).

Accordingly, the user does not have to perform a drag operation in accordance with the orientation of the GUI display or to perform a drag operation after changing the orientation of the display panel 101, upon recognizing the orientation of the GUI display. Thus, an operation independent of the orientation of the GUI display, namely the orientation of the display panel 101, is possible and the operation environment can be improved.

For example, an intuitive operation independent of the orientation of the display panel 101 is possible in the case of adjusting the volume up/down by the operation in the upward/downward direction, in the case of adjusting a playback position forward/backward by the operation to the left/right, and in the case of scrolling the display of the display panel 101 corresponding to the operation in the upward/downward/left/right direction. In particular, the operation can be improved in the case of directly operating the content itself without identifying an object (the case of performing a drag operation without identifying a position on the display panel 101)

[4-2. Rotation Processing of Display Direction]

In the following, there will be described a processing of identifying the direction of an operation of rotating the GUI display of the display panel 101, based on the indication direction of the operating tool M.

Figure 9:
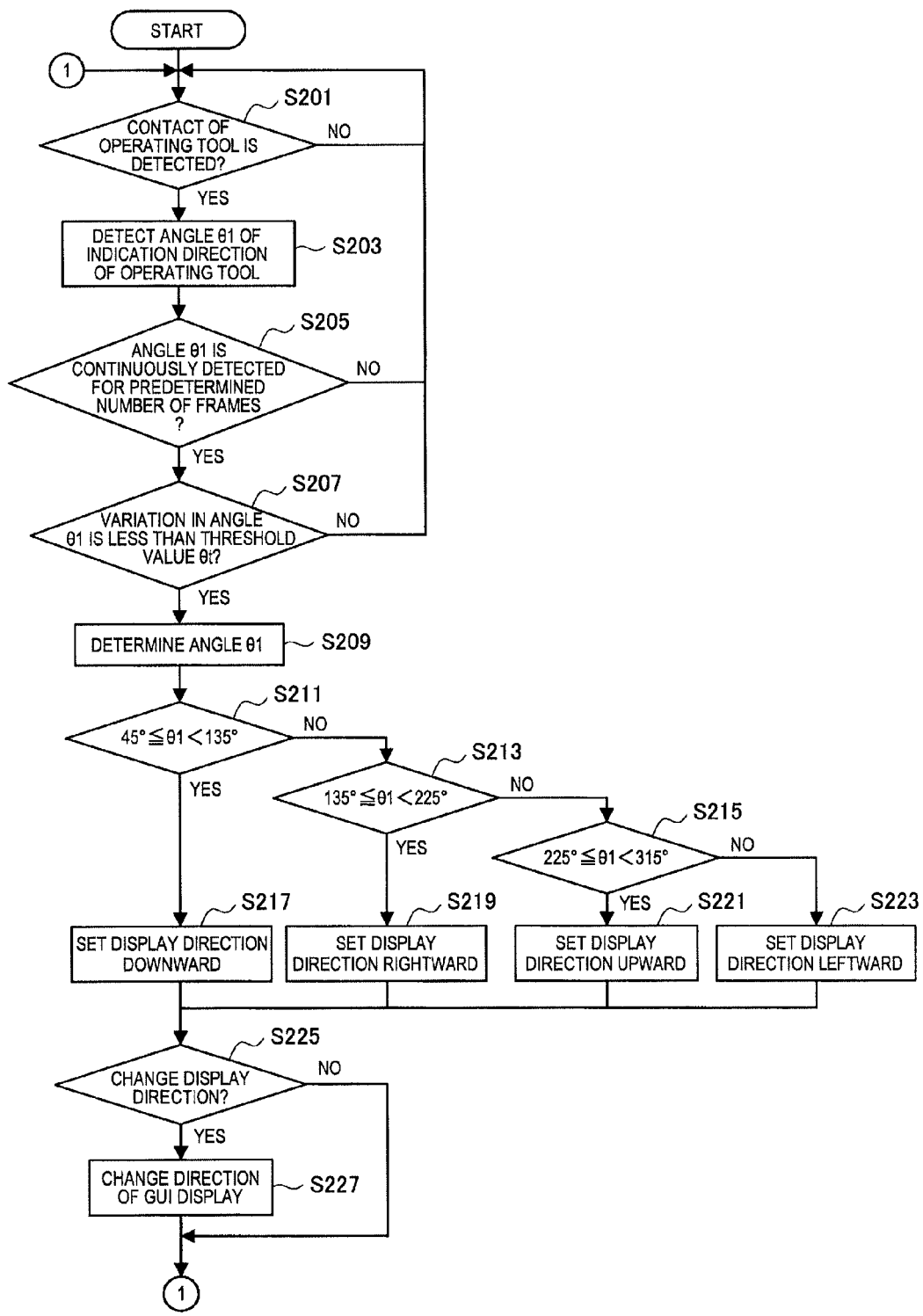
FIG. 9 is a flow diagram showing rotation processing of a display direction.

FIG. 9 and FIG. 10 are a flow diagram and schematic views showing rotation processing of a display direction. In FIG. 10 shown are a case of rotating the display direction downwards (FIG. 10A) and a case of rotating the display direction leftward (FIG. 10B).

When the operating tool detection unit 109 detects contact of the operating tool M (step S201), the operating tool detection unit 109 detects the indication direction of the operating tool M based on the detection method of the operating tool M described above (S203). Here, the indication direction of the operating tool M may be detected in either the state in which the operating tool M is moving or the state in which the operating tool is not moving.

The indication direction of the operating tool M is defined as an angle θ1 based on a coordinate system virtually set on the display panel 101 as shown in FIGS. 10A and 10B, for example. In the following, there will be assumed a case where a usual rectangular coordinate system is set based on the vertical direction and the horizontal direction of the display panel 101. In this case, the angle θ1 is defined counterclockwise from the first quadrant to the fourth quadrant of the rectangular coordinate system.

The operating tool detection unit 109 determines whether the angle θ1 is continuously detected for the predetermined number of frames (S205). Then, if variation in the detection results is less than a predetermined threshold value θt (S207), the operating tool detection unit 109 determines the angle θ1 as an intermediate value of the detection results, or the like (S209).

The control unit 117 identifies the direction of the operation of rotating the GUI display of the display panel 101, based on the angle θ1 indicating the indication direction of the operating tool M (S211, S213, and S215). The display direction is, for example, identified as downward in the case of 45°≤θ1<135° (S217) and is identified as rightward in the case of 135°≤θ1<225° (S219). In the same manner, the display direction is identified as upward in the case of 225°≤θ1<315° (S221) and is identified as leftward in the case of 0°≤θ1<45° or 315°≤θ1<360° (S223).

In addition, in order to enhance identification accuracy of the operation direction, the operation direction may be identified as downward in the angular range 30°≤Δθ<120°. Moreover, the angular range may be adjusted according to the dominant hand of the user.

Here, the direction of the GUI display after the rotation is defined as an orientation in which the top of the GUI display is displayed with respect to the display panel 101 at the time of normal use (in the normal position). That is, a downward display direction means that the top of the GUI display is displayed on the bottom of the display panel 101 in the normal position, and a leftward direction means that the top of the GUI display is displayed on the left of the display panel 101 in the normal position.

When the display direction is identified, the display control unit 115, in the case where the display direction has to be changed (S225), controls the display unit 105 to rotate the GUI display of the display panel 101 according to the identified operation direction (S227). In addition, when the indication direction is changed again, the display direction is changed according to the changed indication direction.

Thus, by rotating the direction of the GUI display of the display panel 101 based on the indication direction of the operating tool M, an operation independent of the direction of the GUI display, namely the orientation of the display panel 101, becomes possible, and the operation environment can be improved

[4-3. Identification Processing of Operation Based on Proximity Gesture]

In the following, there will be described a processing of identifying an operation input by the operating tool M, based on a proximity gesture by the operating tool M on the display panel 101.

Figure 11:
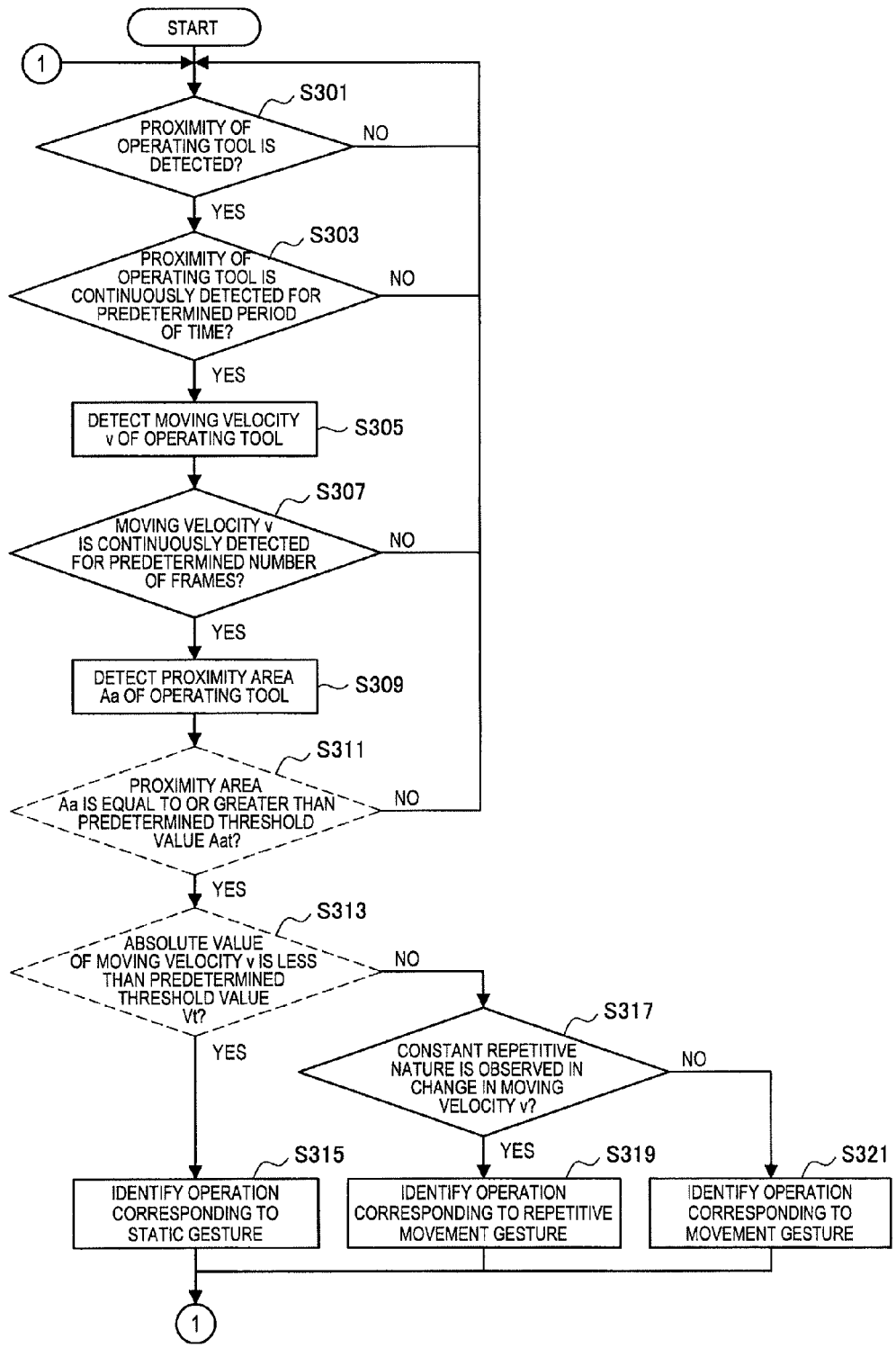
FIG. 11 is a flow diagram showing identification processing of an operation based on a proximity gesture.
Figure 12A:
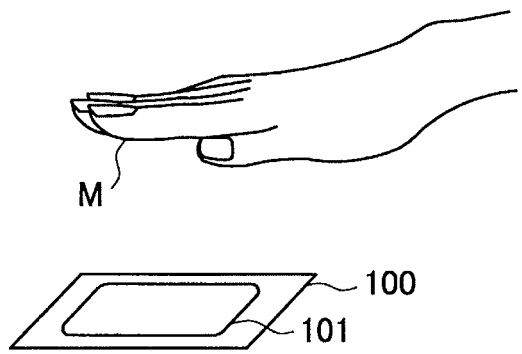
FIG. 12A is a schematic view showing the identification processing of the operation based on the proximity gesture (static gesture).
Figure 12B:
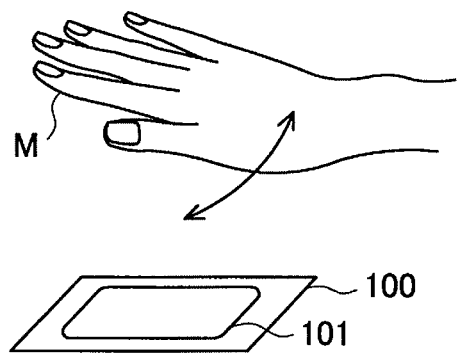
FIG. 12B is a schematic view showing the identification processing of the operation based on the proximity gesture (repetitive movement gesture).
Figure 12C:
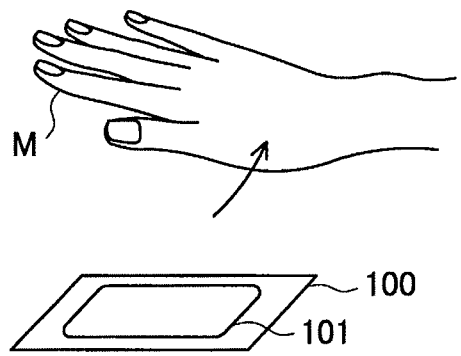
FIG. 12C is a schematic view showing the identification processing of the operation based on the proximity gesture (movement gesture).

FIG. 11 and FIG. 12 are a flow diagram and schematic view showing identification processing of an operation based on a proximity gesture. As an example of the proximity gesture, there are given in FIG. 12 a static gesture of the operating tool M (FIG. 12A), a repetitive movement gesture of the operating tool M (FIG. 12B), and a movement gesture of the operating tool M (FIG. 12C).

For example, the static gesture of the operating tool M is detected as an action of holding a hand still over the display panel 101. The repetitive movement gesture of the operating tool M is detected as an action of repetitively moving the hand horizontally (and/or vertically) over the display panel

101. The movement gesture of the operating tool M is detected as an action of moving the hand horizontally (and/or vertically) over the display panel 101.

In the following, there will be described a case of identifying three operations corresponding to the static gesture, the repetitive movement gesture, and the movement gesture of the operating tool M, but there may be identified four or more operations based on other proximity gestures. In addition, there is assumed that each proximity gesture is associated in advance with gesture information and a specific operation.

When the operating tool detection unit 109 detects proximity of the operating tool M (S301), the operating tool detection unit 109 determines whether the presence or absence of proximity of the operating tool M is continuously detected for a predetermined period of time (e.g., 500 ms) (S303). If the proximity of the operating tool is continuously detected, the operating tool detection unit 109 starts to detect a moving state (S305), and if the proximity of the operating tool is not continuously detected, the operating tool detection unit 109 continues to detect the proximity of the operating tool M.

The moving state of the operating tool M is detected as a horizontal movement and/or a vertical movement of the operating tool M with respect to the display panel 101 within the detection range of the contact/proximity sensor 103. The moving state of the operating tool M is, for example, detected as the moving distance/velocity/acceleration and the like of the operating tool M, but in the following will be assumed a case where the moving velocity v of the operating tool M is detected.

The operating tool detection unit 109 determines whether the moving velocity v of the operating tool M is continuously detected for the predetermined number of frames (S307).

The control unit 117 determines whether the absolute value of the moving velocity v of the operating tool M is less than a predetermined threshold value vt (S313). Then, in the case of positive determination result, the control unit 117 identifies an operation corresponding to the static gesture (S315). On the other hand, if the moving velocity v is equal to or greater than the predetermined threshold value vt and constant repetitive nature is observed in the change in the moving velocity v (in the case of "Yes" at the step S317), the control unit 117 identifies an operation corresponding to the repetitive movement gesture (S319). Moreover, if the moving velocity v is equal to or greater than the predetermined threshold value vt and constant repetitive nature is not observed in the change in the moving velocity v (in the case of "No" at the step S317), the control unit 117 identifies an operation corresponding to the movement gesture (S321).

Here, the operating tool detection unit 109 may detect the proximity area Aa along with the moving velocity v of the operating tool M (S309). And the control unit 117 can accurately identify the operation based on the proximity gesture by identifying the operation based on the moving velocity v only when the proximity area Aa satisfies a predetermined threshold value Aat (e.g., 70% of the area of the display panel 101) (S311). In addition, the proximity area Aa may be determined after the determination by comparison (S313, S317) of the moving velocity v and the threshold value vt.

Thereby, input of various operations becomes possible based on the proximity gesture of the operating tool M on the display panel 101. Accordingly, a user can quickly input a desired operation with the operating tool M without bringing the operating tool M into contact with an object on the display panel 101 (or an operation element for the information processing apparatus 100). Moreover, the user can perform an intuitive operation by giving an arbitrary meaning to each proximity gesture, such as relating the static gesture to a mute operation, relating the repetitive movement gesture to a shuffle operation of a playlist, or relating the movement gesture to a skip operation in the play order.

[4-4. Identification Processing of Operation Based on Contact Gesture]

In the following, there will be described a processing of identifying an operation input by the operating tool M, based on a contact gesture by the operating tool M on the display panel 101.

Figure 13:
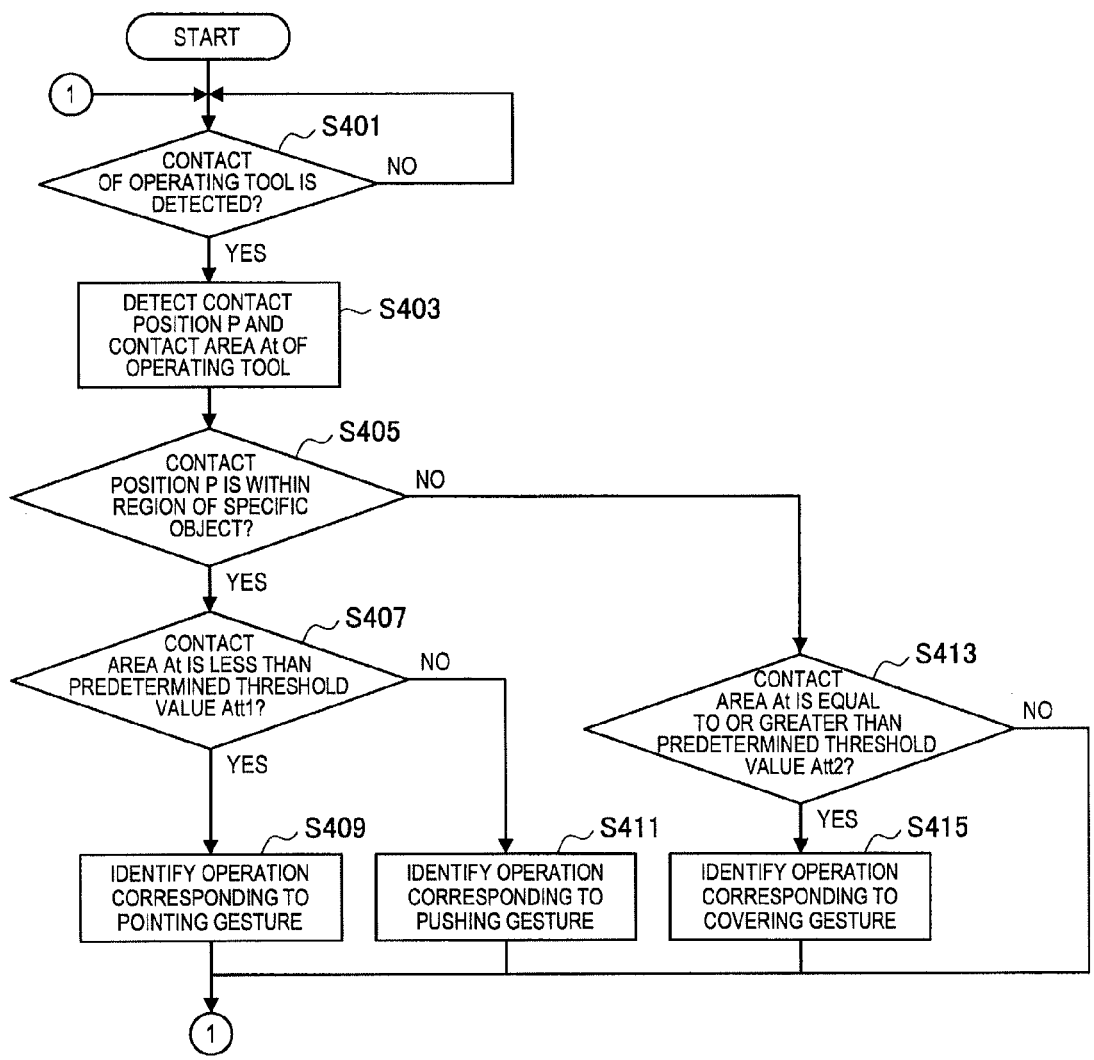
FIG. 13 is a flow diagram showing identification processing of an operation based on a contact gesture.
Figure 14A:
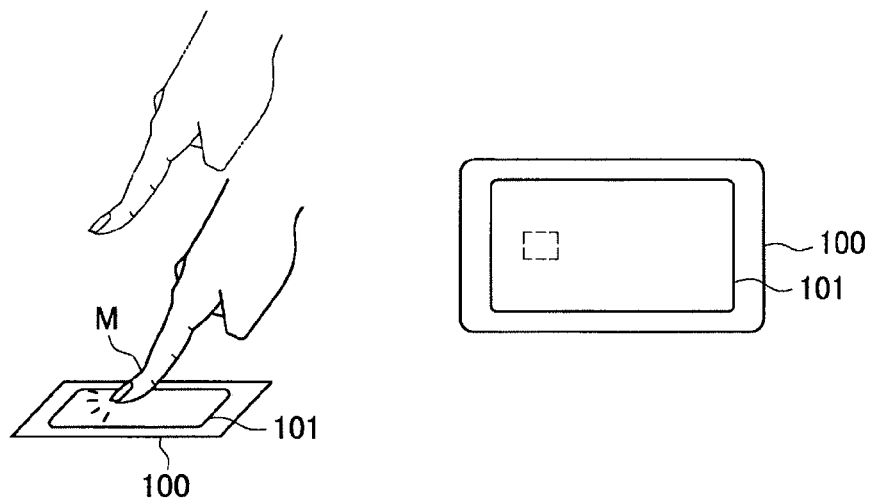
FIG. 14A is a schematic view showing the identification processing of the operation based on the contact gesture (pointing gesture).
Figure 14B:
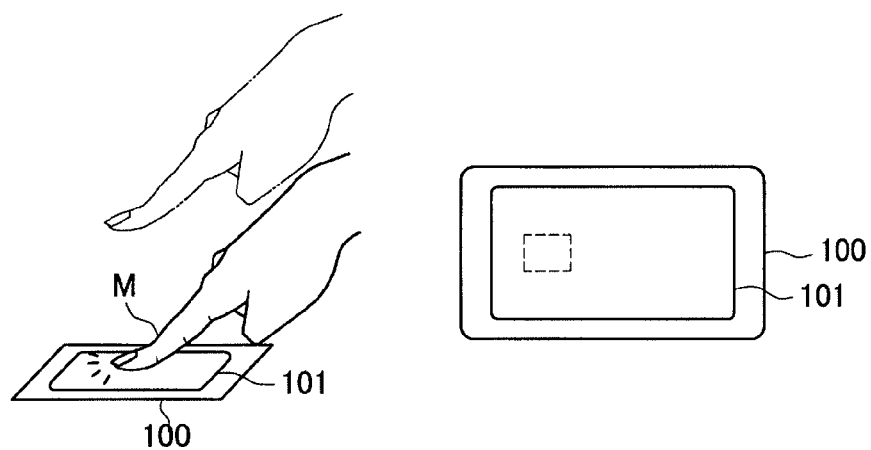
FIG. 14B is a schematic view showing the identification processing of the operation based on the contact gesture (pushing gesture).
Figure 14C:
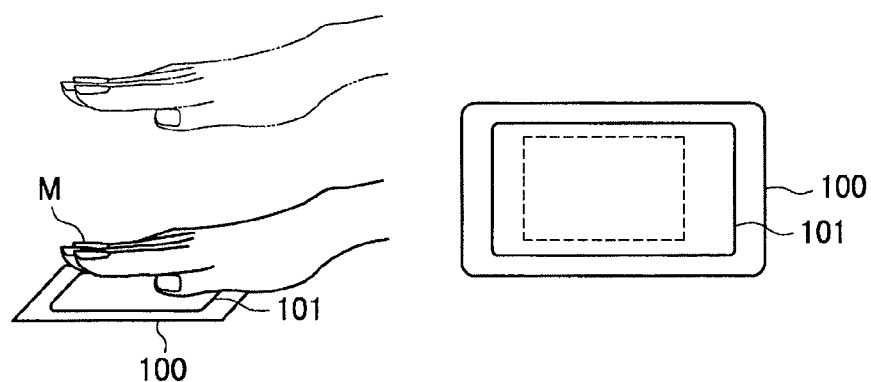
FIG. 14C is a schematic view showing the identification processing of the operation based on the contact gesture (covering gesture).

FIG. 13 and FIG. 14 are a flow diagram and schematic views showing identification processing of an operation based on a contact gesture. In FIG. 14, there is shown, as an example of the contact gesture, a pointing gesture by which an object is specified (FIG. 14A), a pushing gesture by which an object is specified (FIG. 14B), and a covering gesture by which no object is specified (FIG. 14C).

For example, the pointing gesture is an action of bringing a fingertip into contact with an object, and the pushing gesture is an action of bringing the ball of the finger into contact with an object. Moreover, the covering gesture is an action of covering the display panel 101 with a plurality of fingers, for example. Here, each of the contact gestures is detected based on the contact area (and/or the contact form) of the operating tool M with respect to the display panel 101.

In the following, there will be described a case of identifying three operations corresponding to the pointing gesture, the pushing gesture, and the covering gesture, but there may be identified four or more operations based on other contact gestures. In addition, there is assumed that each contact gesture is associated in advance with gesture information and a specific operation.

When the operating tool detection unit 109 detects contact of the operating tool M (S401), the operating tool detection unit 109 detects the contact position P and the contact area At of the operating tool M (S403).

The control unit 117 determines whether the contact position P of the operating tool M is within a region of a specific object (S405). The relationship between the contact position P and the object region is determined based on the position of the object stored in the storage unit 113. Moreover, in the case where the contact position P is within the regions of a plurality of objects, a gesture for not specifying an object is detected.

Then, in the case of positive determination result, the control unit 117 compares the contact area At with a predetermined threshold value Att1 (S407). Then, if the contact area At is less than the threshold value Att1, the control unit 117 identifies an operation corresponding to the pointing gesture (S409), and if the contact area At is equal to or greater than the threshold value Att1, the control unit 117 identifies an operation corresponding to the pushing gesture (S411).

On the other hand, in the case of negative determination result at the step S405, the control unit 117 compares the contact area At with a predetermined threshold value Att2 (Att1<Att2) (S413). Then, if the contact area A is equal to or greater than the threshold value Att2, the control unit 117 identifies an operation corresponding to the covering gesture (S415).

Here, the contact area At may be determined after the determination by comparison (S405) of the contact position P and the object region. Moreover, the operating tool detection unit 109 may detect the form of the contact region, the proximity state of the operating tool M, or the like along with the contact area Aa. Then, the control unit 117 can accurately identify the operation based on the contact gesture by identifying the operation based on the contact area At only when the contact of the fingertip, the ball of the finger, or the like is detected based on the form of the contact region or the proximity state of the operating tool M.

Thereby, input of various operations becomes possible based on the contact gesture of the operating tool M on the display panel 101. In particular, the user can perform an intuitive operation by giving an arbitrary meaning to each contact gesture, such as relating a local operation to a gesture with a fingertip, or relating a global operation to a gesture with a palm.

[4-5. Identification Processing of Operation Based on Contact/Proximity State]

In the following, there will be described a processing of identifying an operation input by the operating tool M, based on the contact/proximity state of the operating tool M on the display panel 101.

FIG. 15 is a flow diagram showing identification processing of an operation based on a contact/proximity state.

At the start of the identification processing, the operating tool detection unit 109 detects the presence or absence of contact of the operating tool M with respect to the display panel 101, and when contact is detected (S501), the operating tool detection unit 109 detects the contact position P and the contact area At of the operating tool M (S503).

The control unit 117 determines whether the contact area At is less than a threshold value Att (S505). In the case of negative determination result, the control unit 117 identifies an in-contact shading operation (operation corresponding to the covering gesture) (S513). On the other hand, in the case of positive determination result, the control unit 117 determines whether the difference between the input starting point and the contact position P is equal to or greater than a threshold value Mt (S507), and in the case of positive determination result, the control unit 117 identifies a drag operation (S509). If the drag operation is identified here, the identification processing of the operation direction described above is performed (S511). On the other hand, in the case of negative determination result, the processing is restarted.

At the start of the processing, the operating tool detection unit 109 detects the presence or absence of proximity of the operating tool M with respect to the display panel 101 (S515). When proximity is detected and if the proximity of the operating tool M is continuously detected for a predetermined time ("Yes" at the step S517), the operating tool detection unit 109 starts to detect the moving velocity v and the proximity area Aa of the operating tool M (S519) and if it is not continuously detected ("NO" at the step S517), the processing is restarted. Subsequently, the control unit 117 determines whether the proximity area Aa is equal to or greater than the threshold value Aat (S521), and in the case of negative determination result, the processing is restarted.

On the other hand, in the case of positive determination result at the step S521, the control unit 117 determines whether the absolute value of the moving velocity v continuously detected for the predetermined number of frames is less than the threshold value vt (S523). Then, in the case of positive determination result, the control unit 117 identifies an in-proximity shading operation (operation corresponding to the static gesture) (S525), and in the case of negative determination result, the control unit 117 identifies an in-proximity shaking operation (operation corresponding to the repetitive movement gesture) (S527).

At the start of the processing, the control unit 117 determines whether the contact of the operating tool M was continuously detected (S529). The control unit 117 determines whether the contact area At was less than the predetermined threshold value Att (S531). Then, in the case of positive determination result, the control unit 117 determines whether the difference between the input starting point and the contact position P is less than the threshold value Mt (S533), and if the determination result is positive, the control unit 117 identifies a tap operation (S535). On the other hand, in the case of negative determination results at the step S529, S531, and S533, the processing is restarted.

In the case of detecting the proximity state of the operating tool M, the display panel 101 and the operating tool M are separated from each other, so that there is a high possibility of false detection compared to the detection of the contact state. However, by a proximity gesture being captured only when the proximity area Aa equal to or greater than the predetermined threshold value Aat is detected, the false detection can be suppressed.

Moreover, in the case of detecting the contact/proximity state of the operating tool M at the same time, there is a high possibility of false detection by capturing the gesture, which is intended as contact gesture by the user, as proximity gesture. However, by a proximity gesture being captured only when the proximity state is detected for a predetermined duration time, the false detection can be suppressed.

[5. Control Method of Detection Mode]

In the following, there will be described a method of controlling, according to the static state or the orientation of the information processing apparatus 100 (also referred to as the own apparatus hereinafter), a mode in which an operation by the operating tool M on the own apparatus is detected.

[5-1. Control Method of Proximity Detection Mode]

First, there will be described an embodiment in which a mode, in which a proximity operation by the operating tool M on the display panel 101 is detected, is controlled according to the static state of the own apparatus.

The contact/proximity sensor 103 consists of a detection unit of a contact operation and a detection unit of a proximity operation. The contact/proximity sensor 103 continuously functions as a contact sensor when the information processing apparatus 100 is running and also functions as a proximity sensor when an application which supports a proximity gesture is running. In the following, there will be assumed a case where power supply systems are separately provided for the detection unit of a contact operation and the detection unit of a proximity operation. The state detection unit 111 includes an acceleration sensor and detects the static state of the own apparatus.

The control unit 117 functions as a mode control unit that controls, according to the static state of the own apparatus, a mode in which an operation by the operating tool M on the own apparatus is detected. In particular, the control unit 117 controls a proximity detection mode in which a proximity operation by the operating tool M on the display panel 101 is detected.

Figure 16:
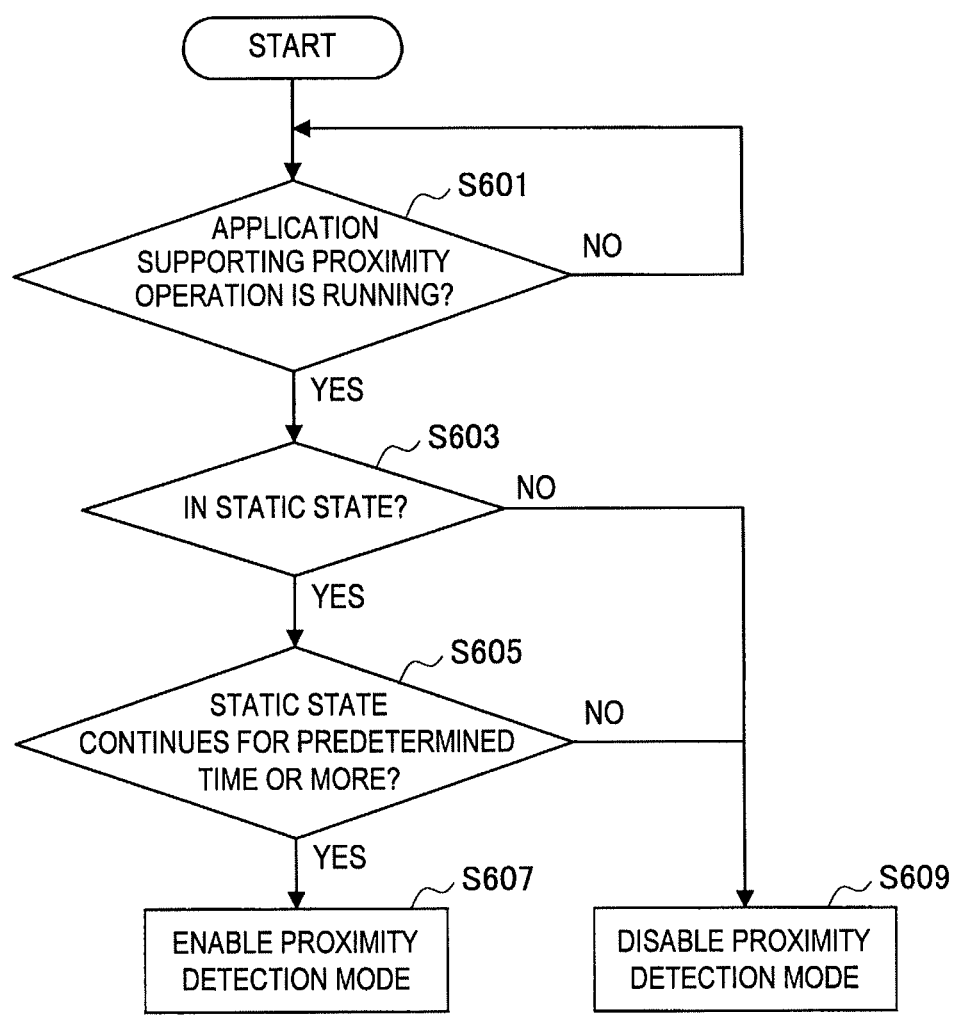
FIG. 16 is a flow diagram showing control processing of a proximity detection mode.

FIG. 16 and FIG. 17 are a flow diagram and schematic views showing control processing of the proximity detection mode.

The control unit 117 determines whether an application which supports a proximity operation is running (S601), and in the case of positive determination result, the control unit 117 determines whether the own apparatus is in a static state according to a detection result by the state detection unit 111 (S603). On the other hand, in the case of negative determination result, the control unit 117 continues to determine whether the application is activated.

In the case where the own apparatus is in a static state, the control unit 117 determines whether the static state continues for a predetermined time (S605), and in the case of positive determination result, the control unit 117 enables the proximity detection mode (S607). On the other hand, in the case of negative determination results at the steps S603 and S605, the control unit 117 disables the proximity detection mode (S609). In this case, detection processing and power supply, each related to the proximity operation, are omitted.

Figure 17A:
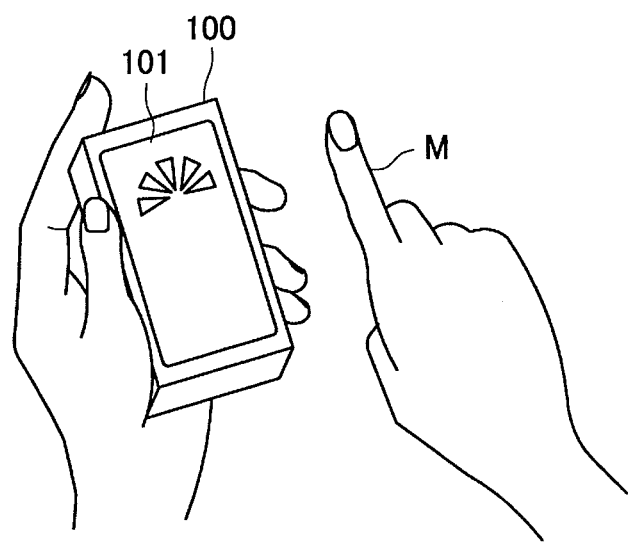
FIG. 17A is a schematic view showing the control processing of the proximity detection mode.

In FIG. 17A shown is a case where the own apparatus is held by the user and is in a static state, when the application which supports a proximity operation is running. In this case, the proximity detection mode is active, and the user can perform a proximity operation by changing the proximity state of the operating tool M with respect to the display panel 101 (contact operation can be also performed in this state).

Figure 17B:
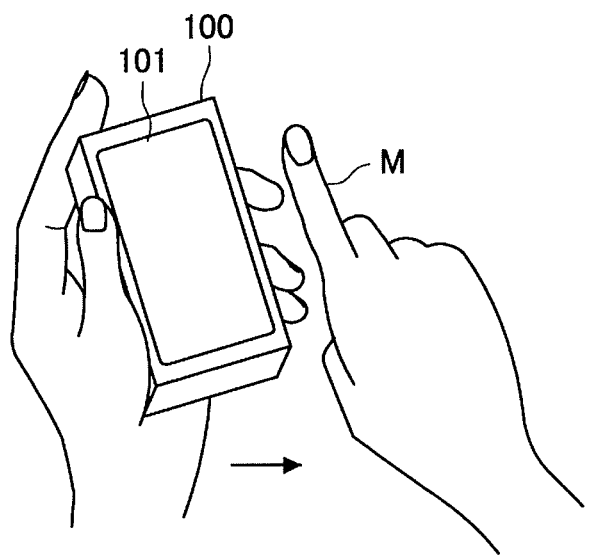
FIG. 17B is a schematic view showing the control processing of the proximity detection mode.

In FIG. 17B shown is a case where the own apparatus is accidentally moved. In this case, if the operating tool M comes close to the display panel 101, a proximity operation unintended by the user is detected unless the proximity detection mode becomes inactive. However, since, when the own apparatus is in a moving state, the proximity detection mode automatically becomes inactive and no proximity operation is detected, the proximity operation unintended by the user is free from being detected. Then, when the own apparatus enters a static state again, the proximity detection mode becomes active, so that the user can restart a proximity operation.

This enables the proximity detection mode to be controlled according to the static state of the own apparatus, so that in the case where the proximity operation does not have to be detected, the detection processing and the power supply, each related to the proximity operation, can be omitted. Moreover, the proximity operation unintended by the user is free from being detected. Furthermore, the user can seamlessly perform the contact operation and the proximity operation without having to control the detection mode by hand.

[5-2. Control Method of Proximity and Remote Detection Modes]

Next, there will be described an embodiment in which modes for detecting proximity and remote operations by the operating tool M on the display panel 101 are controlled according to the static state of the own apparatus.

The contact/proximity sensor 103 and the state detection unit 111 are the same as those in the variation described above. The remote sensor 107 images and captures a remote movement of the operating tool M such as a predetermined gesture. The remote sensor 107 consists of a stereo camera or the like and functions while an application which supports a remote gesture is running. In the following, there will be assumed a case where power supply systems are separately provided for the contact/proximity sensor 103 and the remote sensor 107.

The control unit 117 particularly controls the proximity detection mode in which a proximity operation by the operating tool M on the display panel 101 is detected and a remote detection mode in which a remote operation by the operating tool M on the remote sensor 107 is detected.

Figure 18:
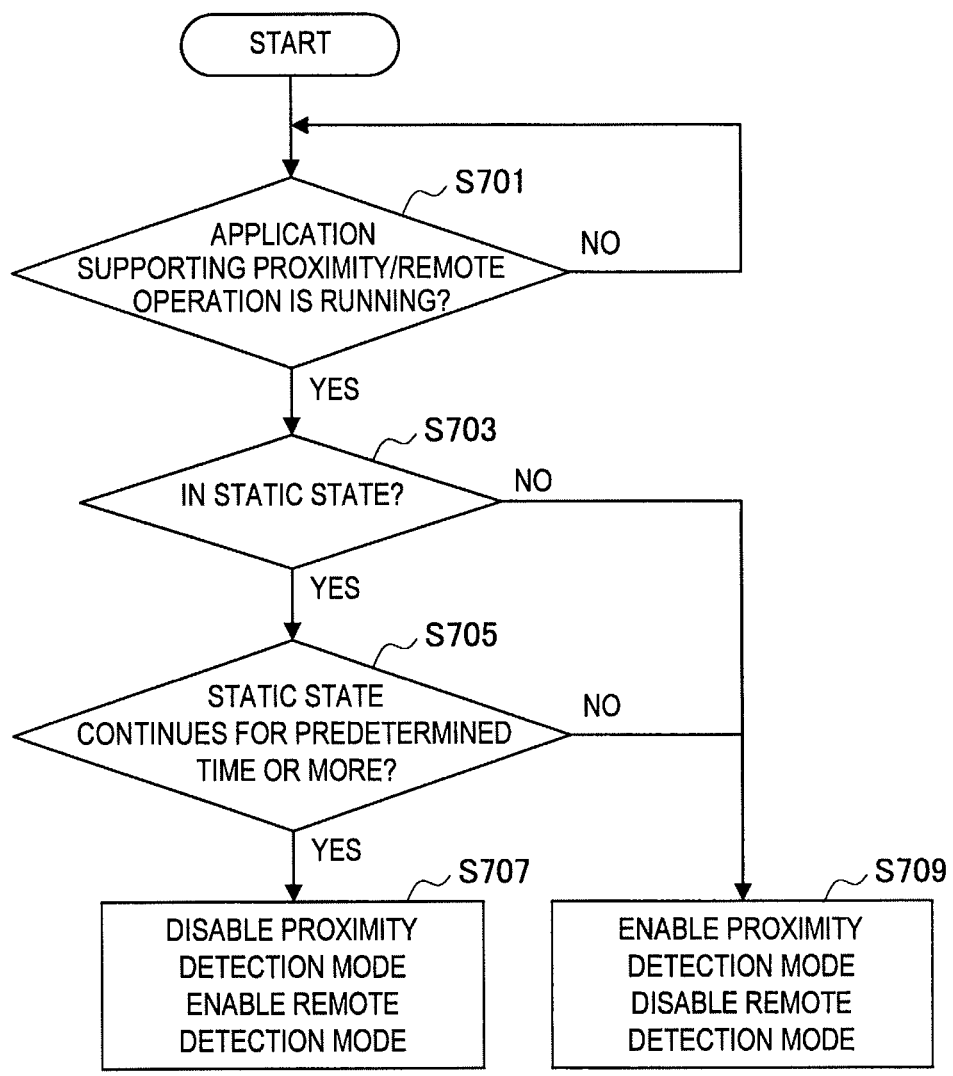
FIG. 18 is a flow diagram showing control processing of proximity and remote detection modes.

FIG. 18 and FIG. 19 are a flow diagram and schematic views showing control processing of the proximity and remote detection modes.

The control unit 117 determines whether an application which supports proximity and remote operations is running (S701), and in the case of positive determination result, the control unit 117 determines whether the own apparatus is in a static state, according to a detection result by the state detection unit 111 (S703). On the other hand, in the case of negative detection result, the control unit 117 continues to determine whether the application is activated.

In the case where the own apparatus is in a static state, the control unit 117 determines whether the static state continues for a predetermined time (S705), and in the case of positive determination result, the control unit 117 disables the proximity detection mode and enables the remote detection mode (S707). In this case, the detection processing and the power supply related to the proximity operation are not performed. On the other hand, in the case of negative determination results at the steps S703 and S705, the control unit 117 enables the proximity detection mode and disables the remote detection mode (S709). In this case, detection processing and power supply, each related to the remote operation, are omitted.

Figure 19A:
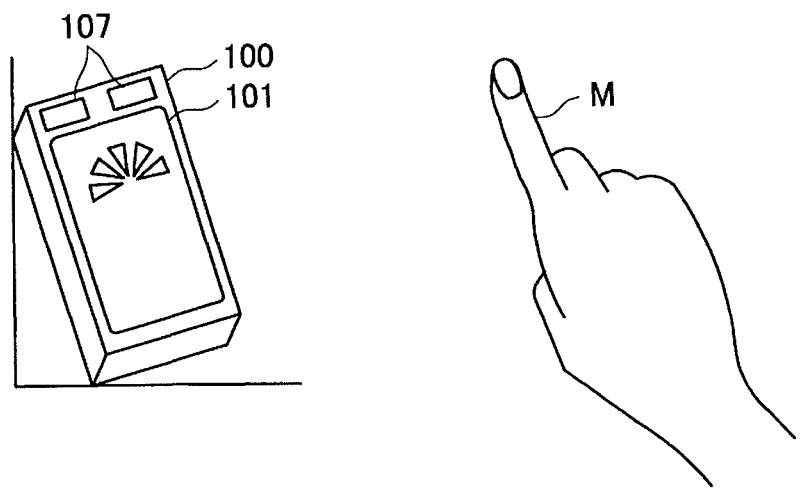
FIG. 19A is a schematic view showing the control processing of the proximity and remote detection modes.

In FIG. 19A shown is a case where the own apparatus is disposed on a desk and in a static state, when the application which supports proximity and remote operations is running. In this case, the remote detection mode is active and the proximity detection mode is inactive, so that the user can perform a remote operation by changing a remote movement of the operating tool M with respect to the own apparatus (contact operation can be also performed in this state).

Figure 19B:
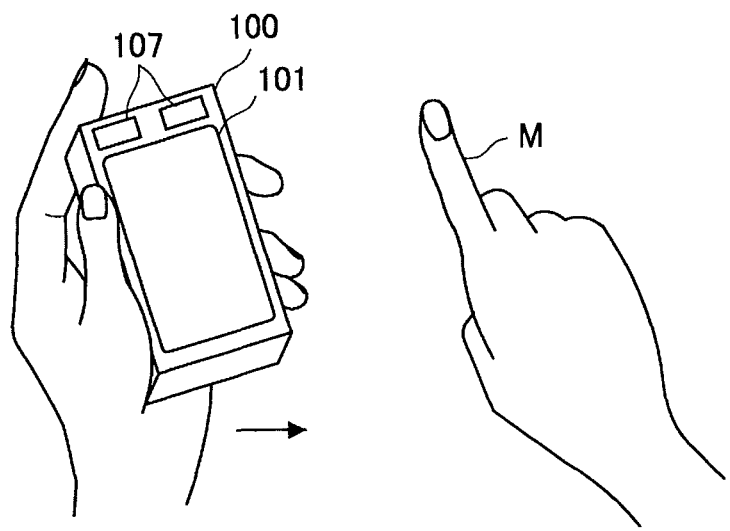
FIG. 19B is a schematic view showing the control processing of the proximity and remote detection modes.

In FIG. 19B shown is a case where the own apparatus is held by the user and is in a moving (vibrating) state in a car or the like. In this case, since the own apparatus is in a moving state, a remote operation unintended by the user may be detected unless the remote detection mode becomes inactive. However, since, when the own apparatus enters a moving state, the remote detection mode automatically becomes inactive and no remote operation is detected, the remote operation unintended by the user is free from being detected. Then, when the own apparatus enters a static state again, the remote detection mode becomes active, so that the user can restart a remote operation.

This enables the proximity detection mode and remote detection modes to be controlled according to the static state of the own apparatus, so that, in the case where the proximity operation or the remote detection mode does not have to be detected, the detection processing and the power supply each related to the proximity operation or the remote detection mode can be omitted. Moreover, the remote operation unintended by the user is free from being detected. Furthermore, the user can seamlessly perform the proximity operation and the remote operation without having to control the detection modes by hand.

[5-3. Control Method of Contact Detection Mode]

Furthermore, there will be described a method of controlling a mode for detecting a contact operation by the operating tool M on the own apparatus according to an orientation of the own apparatus.

In the present embodiment, a primary sensor 103 is provided on the display panel 101 of the own apparatus, and secondary sensors 104R and 104L are provided on each side along the long axis and secondary sensors 104U and 104D are provided on each side along the short axis of the own apparatus. The primary sensor 103 detects a contact operation of the operating tool M on the display panel 101, and the secondary sensors 104R, 104L, 104U and 104D detect a contact operation of the operating tool M, for example, in order to scroll the GUI display of the display panel 101. In the following, there will be described a case where power supply systems are separately provided for the secondary sensors 104R, 104L, 104U and 104D.

The state detection unit 111 includes a gyroscope and detects the orientation of the own apparatus. In the following, cases where the directions of the long axis and the short axis of the own apparatus are vertical to the user will be respectively called vertical orientation and horizontal direction. The state detection unit 111 detects whether the own apparatus is vertically oriented and horizontally oriented.

The control unit 117 particularly controls the detection mode for detecting a contact operation on the secondary sensors 104R, 104L, 104U and 104D. For example, in the case where the own apparatus is vertically oriented, the control unit 117 enables detection by the secondary sensors 104R and 104L and disables detection by the secondary sensors 104U and 104D, and in the case where the own apparatus is horizontally oriented, the control unit 117 disables detection by the secondary sensors 104R and 104L and enables detection by the secondary sensors 104U and 104D. In particular, the control unit 117 enables the secondary sensors 104R, 104L, 104U and 104D related to the dominant hand of the user according to the orientation of the own apparatus. In the following, there will be assumed a case where the user is right-handed.

Figure 20:
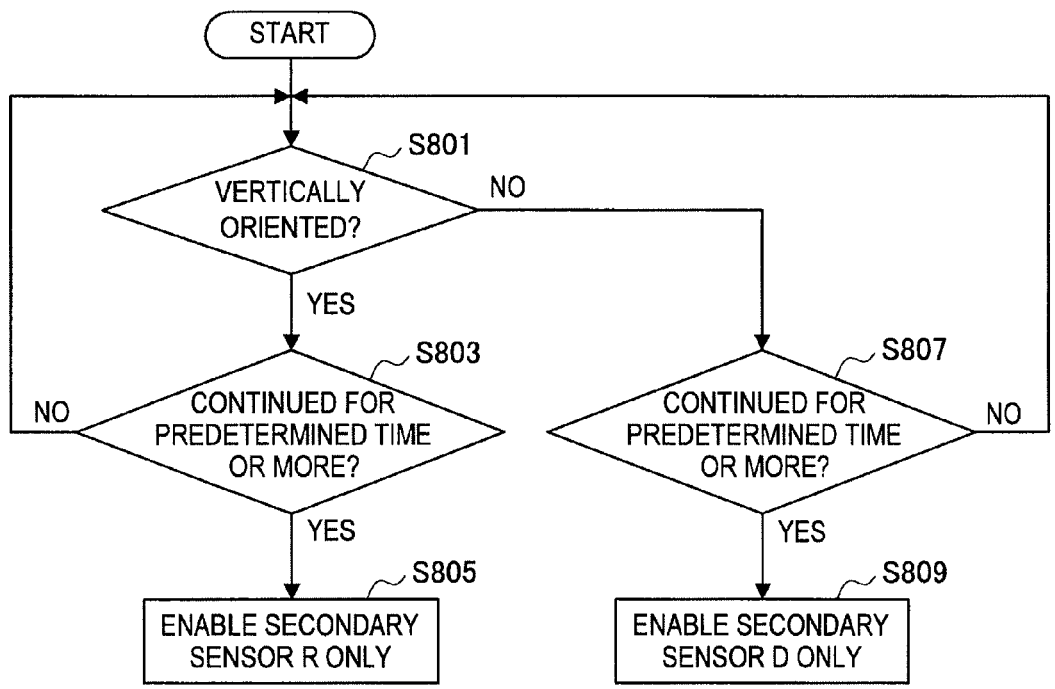
FIG. 20 is a flow diagram showing control processing of a contact detection mode.
Figure 21A:
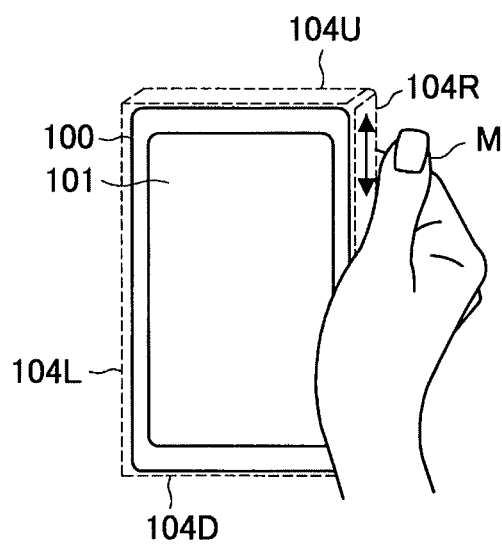
FIG. 21A is a schematic view showing the control processing of the contact detection mode.
Figure 21B:
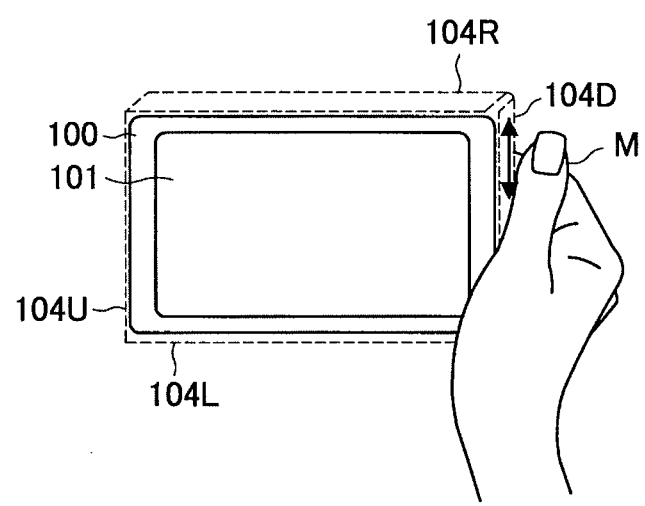
FIG. 21B is a schematic view showing the control processing of the contact detection mode.

FIG. 20 and FIG. 21 are a flow diagram and schematic views showing control processing of a contact detection mode.

The control unit 117 determines whether the own apparatus is vertically oriented, according to the sensor output from the state detection unit 111 (S801), and in the case of positive determination result (FIG. 21A), the control unit 117 determines whether the own apparatus is kept vertically oriented for a predetermined time (S803). Then, in the case of positive determination result, the control unit 117 enables the secondary sensor 104R on the right side with respect to the user and disables the other secondary sensors 104L, 104U and 104D (S805).

On the other hand, in the case where the own apparatus is horizontally oriented (e.g., the top of the display panel 101 is oriented on the left side with respect to the user), the control unit 117 determines whether the own apparatus is kept horizontally oriented for a predetermined time (S807). In the case of positive determination result (FIG. 21B), the control unit 117 enables the secondary sensor 104D on the right side with respect to the user and disables the other secondary sensors 104R, 104L and 104U (S809).

Figure 22:
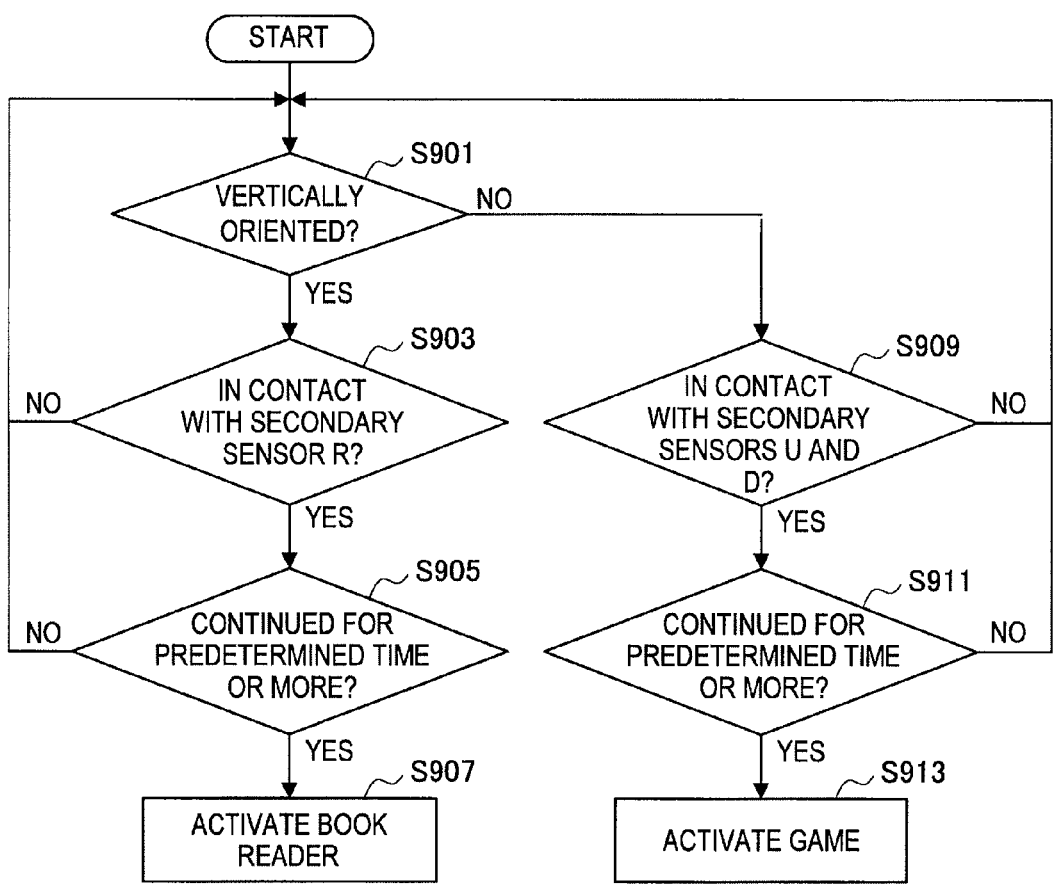
FIG. 22 is a flow diagram showing control processing of application activation.
Figure 23A:
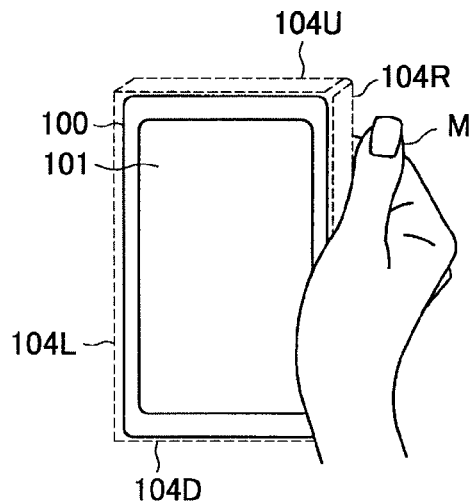
FIG. 23A is a schematic view showing the control processing of the application activation.
Figure 23B:
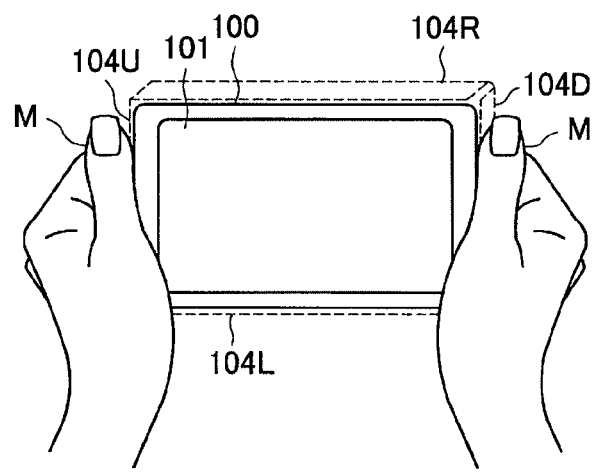
FIG. 23B is a schematic view showing the control processing of the application activation.
Figure 23C:
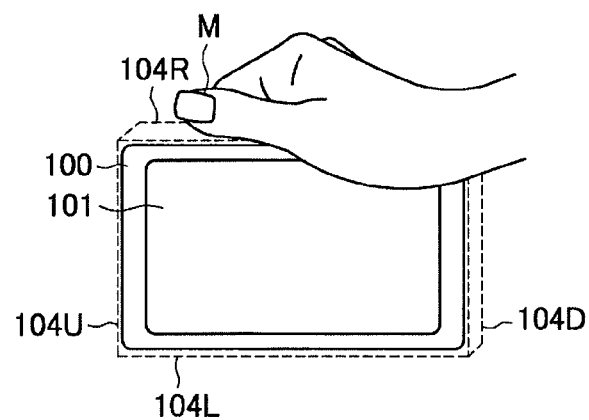
FIG. 23C is a schematic view showing the control processing of the application activation.

Moreover, FIG. 22 and FIG. 23 are a flow diagram and schematic views showing control processing of application activation.

The control unit 117 determines whether the own apparatus is vertically oriented, according to the detection result of the state detection unit 111 (S901), and in the case of positive determination result (FIG. 23A), the control unit 117 determines whether the operating tool M is in contact with the secondary sensor 104R (S903). Next, in the case of positive determination result, the control unit 117 determines whether the operating tool M is kept in contact with the secondary sensor 104R for a predetermined time (S905). Then, in the case of positive determination result, the control unit 117 activates a book reader (S907).

On the other hand, in a case where the own apparatus is horizontally oriented (e.g., the top of the display panel 101 is oriented on the left side with respect to the user), the control unit 117 determines whether the operating tool M is in contact with the secondary sensors 104U and 104D (S909). Next, in the case of positive determination result, the control unit 117 determines whether the operating tool M is kept in contact with the secondary sensors 104U and 104D for a predetermined time (S911). Then, in the case of positive determination result (FIG. 23B), the control unit activates a game (S913).

Moreover, the control unit 117 does not have to activate the book reader in a case where the own apparatus is horizontally oriented and the operating tool M is in contact with one of the secondary sensors 104R, 104L, 104U and 104D by the user trying to hold the own apparatus up, for example.

This enables the contact detection mode to be controlled according to the orientation of the own apparatus, so that, in the secondary sensors 104 not subjected to a contact operation, detection processing and power supply each related to the contact operation can be omitted.

[6. Hardware Configuration of Information Processing Apparatus 100]

FIG. 24 is a block diagram showing an example of the hardware configuration of the information processing apparatus 100.

The information processing apparatus 100 is configured to mainly include a CPU 901, a ROM 903, a RAM 905, a host bus 907, a bridge 909, an external bus 911, an interface 913, an input device 915, an output device 917, a storage device 919, a drive 921, a connection port 923, and a communication device 925.

The CPU 901 functions as an arithmetic processing device and a control device and controls the operation of the information processing apparatus 100 at least partially according to various programs stored in the ROM 903, the RAM 905, the storage device 917, or a removable recording medium 927. The ROM 903 stores therein programs, parameters and the like used by the CPU 901. The RAM 905 temporarily stores therein the programs executed by the CPU 101 and parameters at the time of the execution of the programs and the like. The CPU 101, the ROM 903, and the RAM 905 are interconnected by the host bus 907. The host bus 907 is connected to the external bus 911 via the bridge 909.

The input device 915 is an operation means operable by a user, such as a mouse, a keyboard, a display panel 101, a button, and a switch. Moreover, the input device 915 may be, for example, a remote operation means using electric wave such as infrared ray or an external device 929, such as a portable phone and a PDA, which supports on the information processing apparatus 100. The input device 915 configured to include, for example, an input control circuit, or the like, for generating an input signal based on operation information input by a user by using the operation means mentioned above and outputting the signal to the CPU 901. The user of the information processing apparatus 100 inputs various data into and gives instruction for processing operation to the information processing apparatus 100.

The output device 917 configured to include a device capable of notifying a user of obtained information visually and acoustically, such as a display device such as a CRT display, a liquid crystal display, the display panel 101 and a lamp, an audio output device such as a speaker or a headphone, a printer, a portable phone and a facsimile. The output device 917 outputs a processing result of the information processing apparatus 100. For example, the display device displays the processing result of the information processing apparatus 100 as text information or image information, and the audio output device converts audio signals of replayed audio data, acoustic data, and the like, into analogue signals and outputs them.

The storage device 919 is a device for data storage, which includes, for example, a magnetic storage device such as a HDD, a semiconductor storage device, an optical storage device, or a magnetooptical storage device. The storage device 919 stores therein the programs executed by the CPU 901, various data, various data obtained from the outside, and the like.

The drive 921 is a reader/writer for recording medium and is built into or attached outside to the information processing apparatus 100. The drive 921 reads out recorded data from the attached removable recording medium 927 such as a magnetic disk, an optical disk, a magneto-optical disk and a semiconductor memory, and outputs the data to the RAM 905 and writes the data to be recorded.

The connection port 923 is a port for directly connecting the external device 929 to the information processing apparatus 100, such as a USB port, a SCSI port and a RS232C port. The information processing apparatus 100 obtains data from and provides data to the external device 929 connected to the connection port 923, via the connection port 923.

The communication device 925 is a communication interface consisting of, for example, a communication device for connecting to a communication network N. The communication device 925 is a wired or wireless LAN, a WUSB communication card, an ADSL router, or a communication modem, for example. The communication device 925 performs transmission and reception of a signal or the like with the Internet or another communication device in accordance with a predetermined protocol, for example. The communication network N connected to the communication device 925 consists of a network connected wired or wirelessly, or the like. For example, the communication network N may be the Internet, a home LAN, infrared data communication, radio wave communication, satellite communication, or the like.

In the above, an example of the hardware configuration for realizing the function of the information processing apparatus 100 according to the embodiment of the present invention has been described. In addition, each of the components of the hardware described above may be composed by using a device used for general purpose or may be composed by using a device specialized for the function of the each component.

[7. Summary]

As described above, the information processing apparatus 100 according to the embodiment of the present invention detects an indication direction of the operating tool M in contact with the display panel 101 and identifies a direction of an operation input by the operating tool M, based on the detected indication direction of the operating tool M. Thereby, the direction of the operation is identified based on the indication direction of the operating tool M, so that an operation independent of the orientation of the display panel 101 with respect to a user becomes possible.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

REFERENCE SIGNS LIST

100 Information processing apparatus
101 Display panel
103 Contact/proximity sensor
105 Display unit
107 Remote sensor
109 Operating tool detection unit
111 State detection unit
113 Storage unit
115 Display control unit
117 Control unit (operation identification unit, mode control unit)

The invention claimed is:

1. An information processing apparatus comprising:
an operating tool detection unit that detects an indication direction and a moving direction of an operation tool moving while in contact with a display;
an operation identification unit that identifies a direction of an operation input by the operating tool, based on the detected indication direction and the detected moving direction of the operating tool, and based on an angle defined by a difference between the detected indication direction and the detected moving direction of the operating tool; and
a control unit that controls, according to an orientation of the display and also based on whether the display is in a static state or in a moving state, a mode in which an operation of the operating tool is detected,
wherein the display is determined to be in the moving state when the display is detected to be vibrating, and the display is determined to be in the static state when the display is not detected to be vibrating,
wherein the indication direction is detected as an orientation of the operation tool after the operation tool has been made to be in contact with the display, and
wherein the operating tool detection unit, the operation identification unit, and the control unit are each implemented via at least one processor.

2. The information processing apparatus according to claim 1, further comprising
a display control unit that controls display of the display,
wherein the operation identification unit identifies a direction of an operation of rotating display of the display, based on the detected indication direction of the operating tool, and
wherein the display control unit rotates the display of the display according to the identified direction of the operation.

3. The information processing apparatus according to claim 1,
wherein the operation identification unit identifies a direction of an operation input by the operating tool, independently of an orientation of the display with respect to an operator.

4. The information processing apparatus according to claim 1,
wherein the operating tool detection unit determines an indication direction of the operating tool based on an orientation of a tip portion of the operating tool.

5. The information processing apparatus according to claim 1,
wherein the operating tool detection unit continuously detects an indication direction of the operating tool and determines, when the continuously detected indication direction of the operating tool is within a predetermined threshold value, an indication direction of the operating tool based on the continuously detected indication direction of the operating tool.

6. The information processing apparatus according to claim 1, wherein the detected indication direction is not a preregistered or a predetermined direction of orientation.

7. The information processing apparatus according to claim 1, wherein the mode in which the operation of the operating tool is detected is selected from a first mode and a second mode, the first mode and the second mode characterized by having different sensors being activated for detecting the contact made upon the display by the operation tool.

8. The information processing apparatus according to claim 1, wherein the control unit controls the mode in which the operation of the operating tool is detected to be a proximity detection mode when the display is determined to be in the static state for a predetermined period of time.

9. An information processing method, performed via at least one processor, the method comprising:
 detecting an indication direction and a moving direction of an operation tool moving while in contact with a display;
 identifying a direction of an operation input by the operating tool, based on the detected indication direction and the detected moving direction of the operating tool, and based on an angle defined by a difference between the detected indication direction and the detected moving direction of the operating tool; and
 controlling, according to an orientation of the display and also based on whether the display is in a static state or in a moving state, a mode in which an operation of the operating tool is detected,
 wherein the display is determined to be in the moving state when the display is detected to be vibrating, and the display is determined to be in the static state when the display is not detected to be vibrating, and
 wherein the indication direction is detected as an orientation of the operation tool after the operation tool has been made to be in contact with the display.

10. The information processing method according to claim 9, wherein the detected indication direction is not a preregistered or a predetermined direction of orientation.

11. The information processing method according to claim 9, wherein the mode in which the operation of the operating tool is detected is controlled to be a proximity detection mode when the display is determined to be in the static state for a predetermined period of time.

12. A non-transitory computer-readable medium having embodied thereon a program, which when executed by a computer causes the computer to carry out an information processing method, the method comprising:
 detecting an indication direction and a moving direction of an operation tool moving while in contact with a display;
 identifying a direction of an operation input by the operating tool, based on the detected indication direction and the detected moving direction of the operating tool, and based on an angle defined by a difference between the detected indication direction and the detected moving direction of the operating tool; and
 controlling, according to an orientation of the display and also based on whether the display is in a static state or in a moving state, a mode in which an operation of the operating tool is detected,
 wherein the display is determined to be in the moving state when the display is detected to be vibrating, and the display is determined to be in the static state when the display is not detected to be vibrating, and
 wherein the indication direction is detected as an orientation of the operation tool after the operation tool has been made to be in contact with the display.

13. The non-transitory computer-readable medium according to claim 12, wherein the detected indication direction is not a preregistered or a predetermined direction of orientation.

14. The non-transitory computer-readable medium according to claim 12, wherein the method further comprises controlling the mode in which the operation of the operating tool is detected to be a proximity detection mode when the display is determined to be in the static state for a predetermined period of time.

* * * * *